United States Patent
Hilpert

[11] 3,692,160
[45] Sept. 19, 1972

[54] FLUID POWER CONTROL SYSTEM FOR VEHICLES

[72] Inventor: Conrad R. Hilpert, Winnebago, Ill. 61088

[73] Assignee: Twin Disc, Incorporated, Racine, Wis.

[22] Filed: Aug. 24, 1970

[21] Appl. No.: 66,282

[52] U.S. Cl. .............................. 192/4 C, 180/77 R
[51] Int. Cl. ...................... F16d 67/04, F16h 57/06
[58] Field of Search ....180/70 R, 77 R; 192/4 R, 4 A, 192/4 C

[56] References Cited

UNITED STATES PATENTS

| | | | |
|---|---|---|---|
| 3,458,018 | 7/1969 | Shore | 192/4 C |
| 3,348,644 | 10/1967 | Hilpert | 192/4 C |
| 3,400,601 | 9/1968 | Ruhl et al. | 192/4 C X |
| 3,437,184 | 4/1969 | Wilson | 192/4 C |
| 3,481,435 | 12/1969 | Pearce et al. | 192/4 C |
| 3,540,556 | 11/1970 | Snoy et al. | 192/4 C |

*Primary Examiner*—Kenneth H. Betts
*Assistant Examiner*—Leslie J. Paperner
*Attorney*—James F. Nilles

[57] ABSTRACT

A fluid power control system for a vehicle having forward, reverse and speed range clutches, and the vehicle being driven from a source of power, such as an internal combustion engine, through a torque converter, which is controlled by a fluid actuated and modulated main clutch. The control system includes inhibitor valve means which functions to inhibit the shifting of the clutches between forward and reverse directions above predetermined vehicle speeds, and also inhibit speed gear shifting in a downward direction above a predetermined speed.

The control system also includes cross-over valve means connected with the direction clutches and the speed change clutches so that when a shift from one clutch to the other is called for by the action of the operator, the clutch which had been engaged is held in engagement until the newly selected clutch is at least partially engaged, and then the clutch which had been engaged is released. This functions to eliminate heat generation which is otherwise caused by slow shifting which in turn permits the vehicle power source to build up inertia energy in the power input parts, such as the flywheels, main clutch and torque converter. The cross-over valve means thus eliminates the heat build up due to the conventional between-gears-neutral position, and the valve means are effective regardless of how slowly the clutches are shifted.

4 Claims, 20 Drawing Figures

INVENTOR:
CONRAD R. HILPERT
BY: James E. Nilles
ATTORNEY

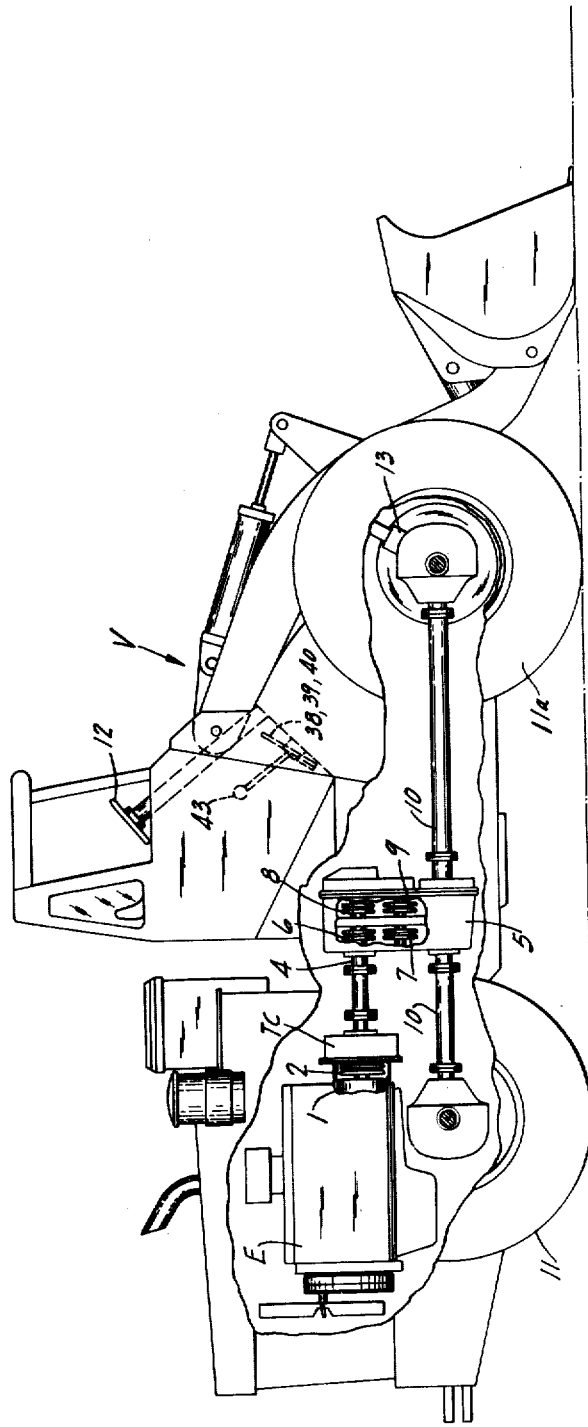

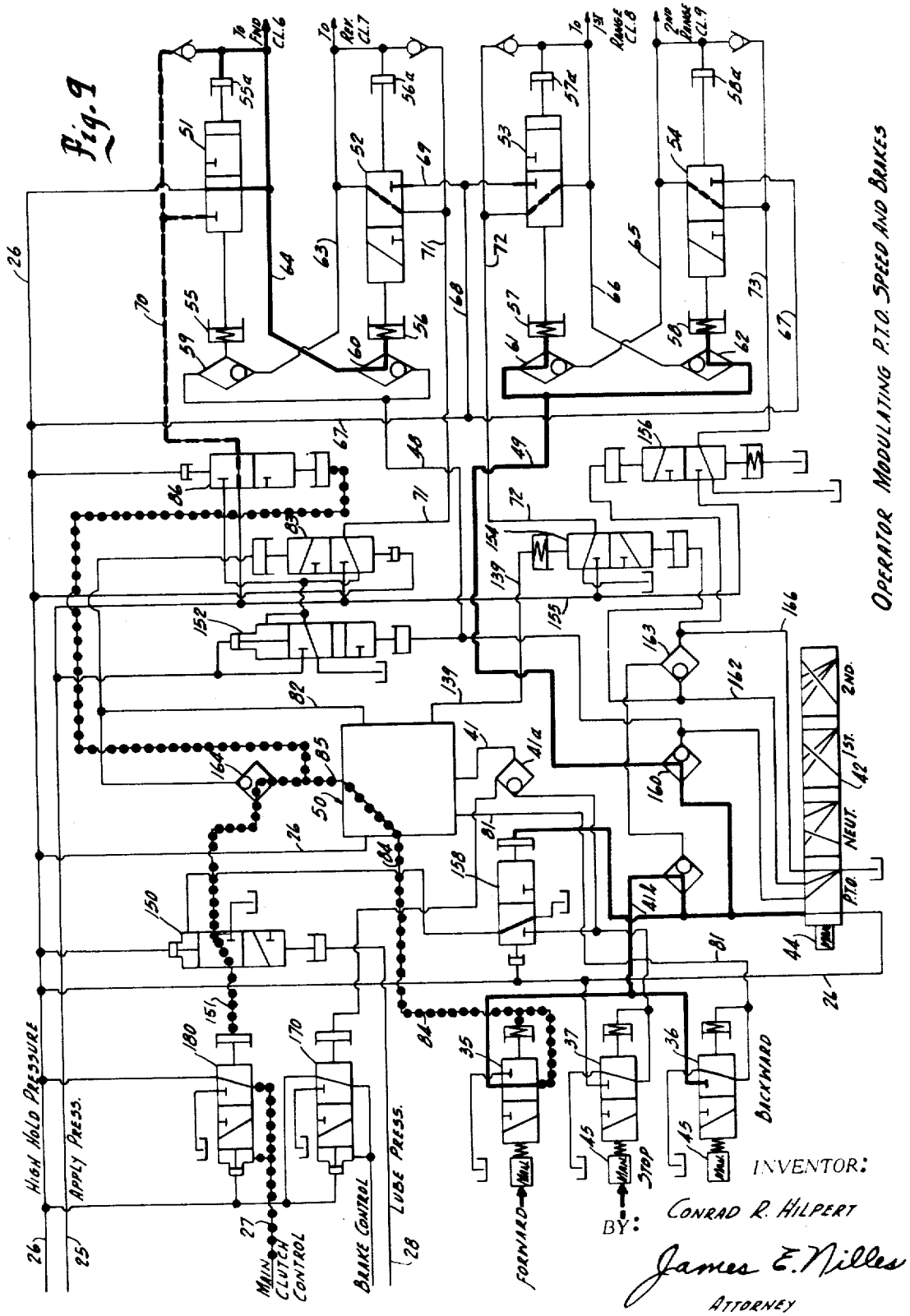

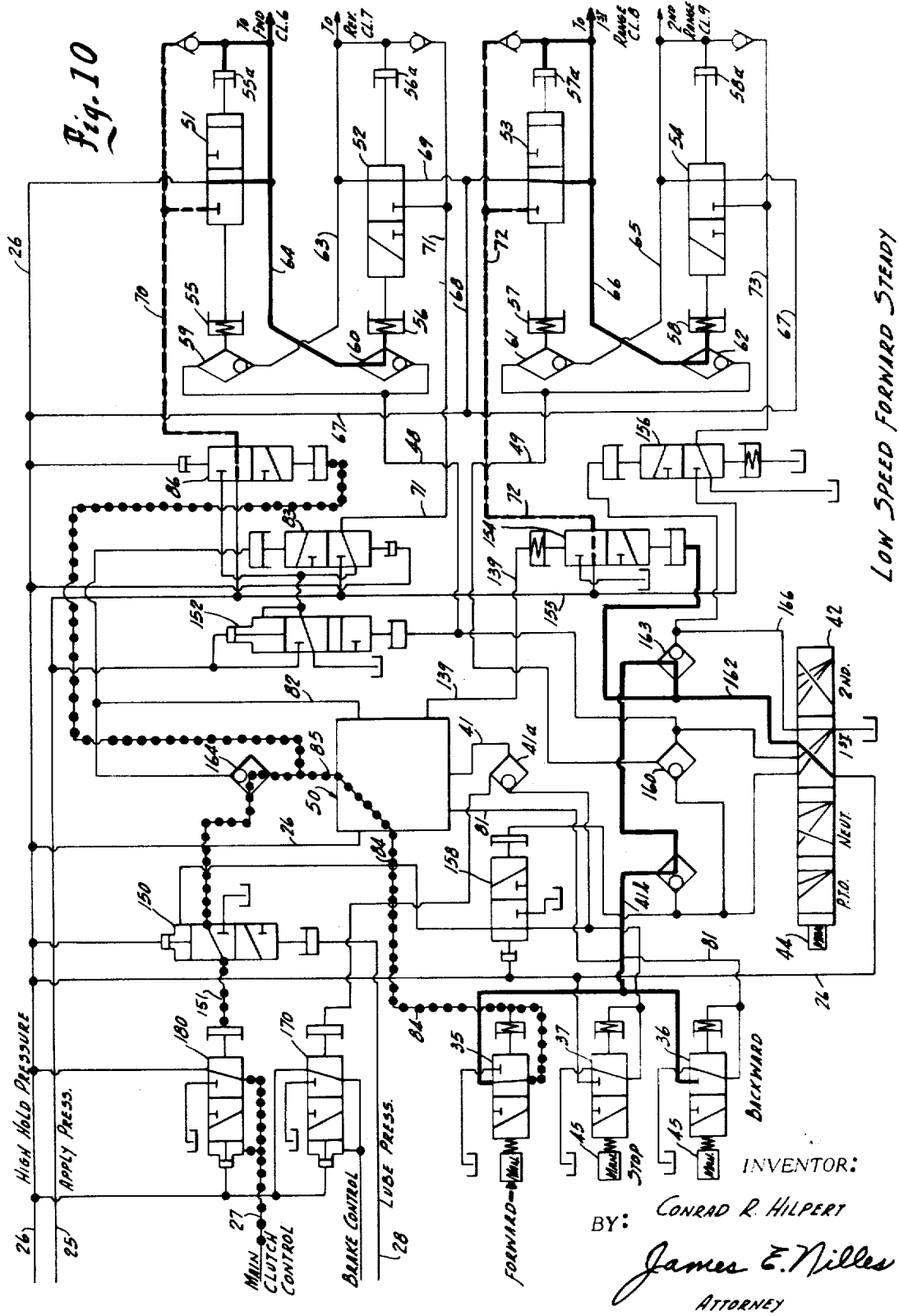

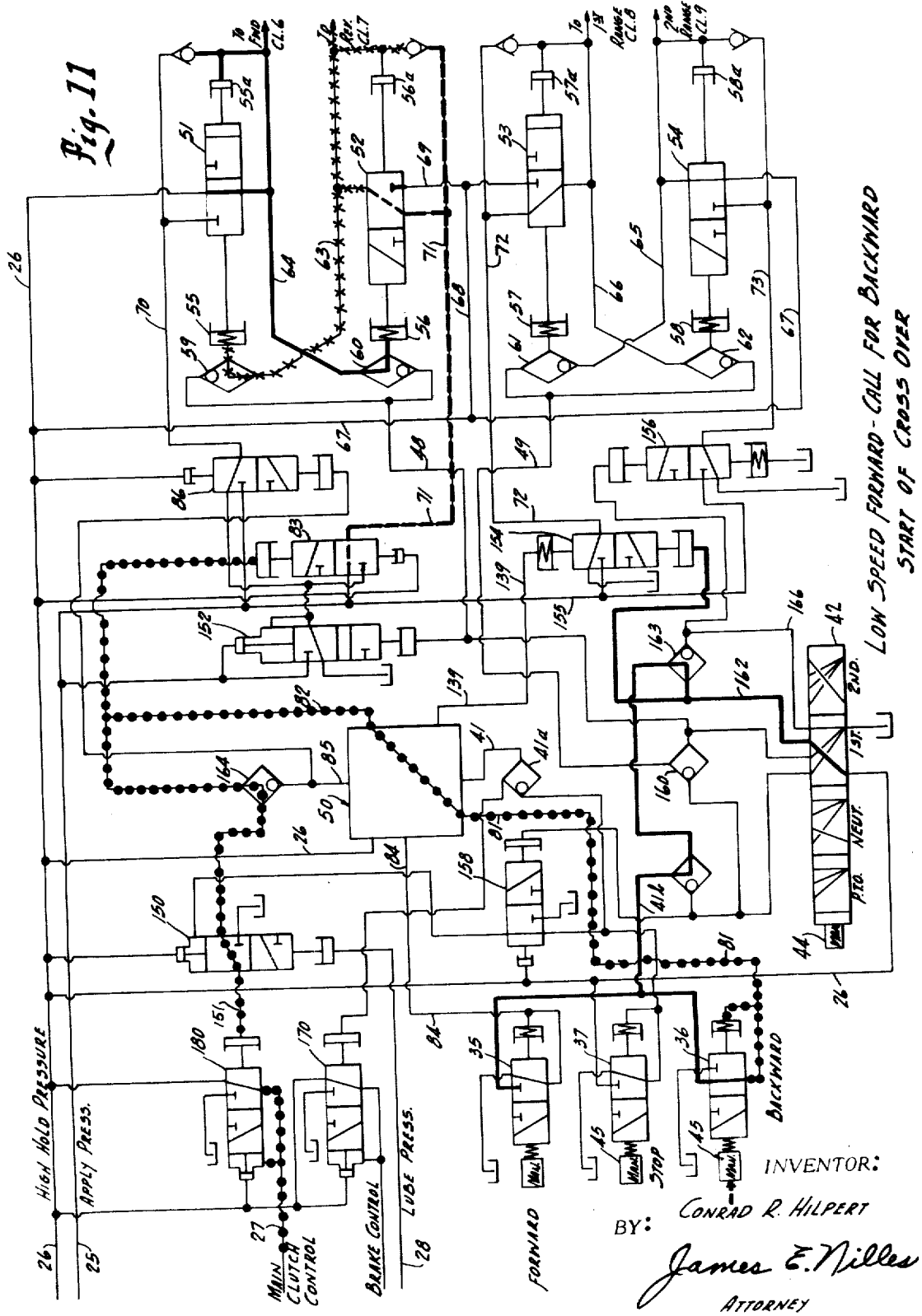

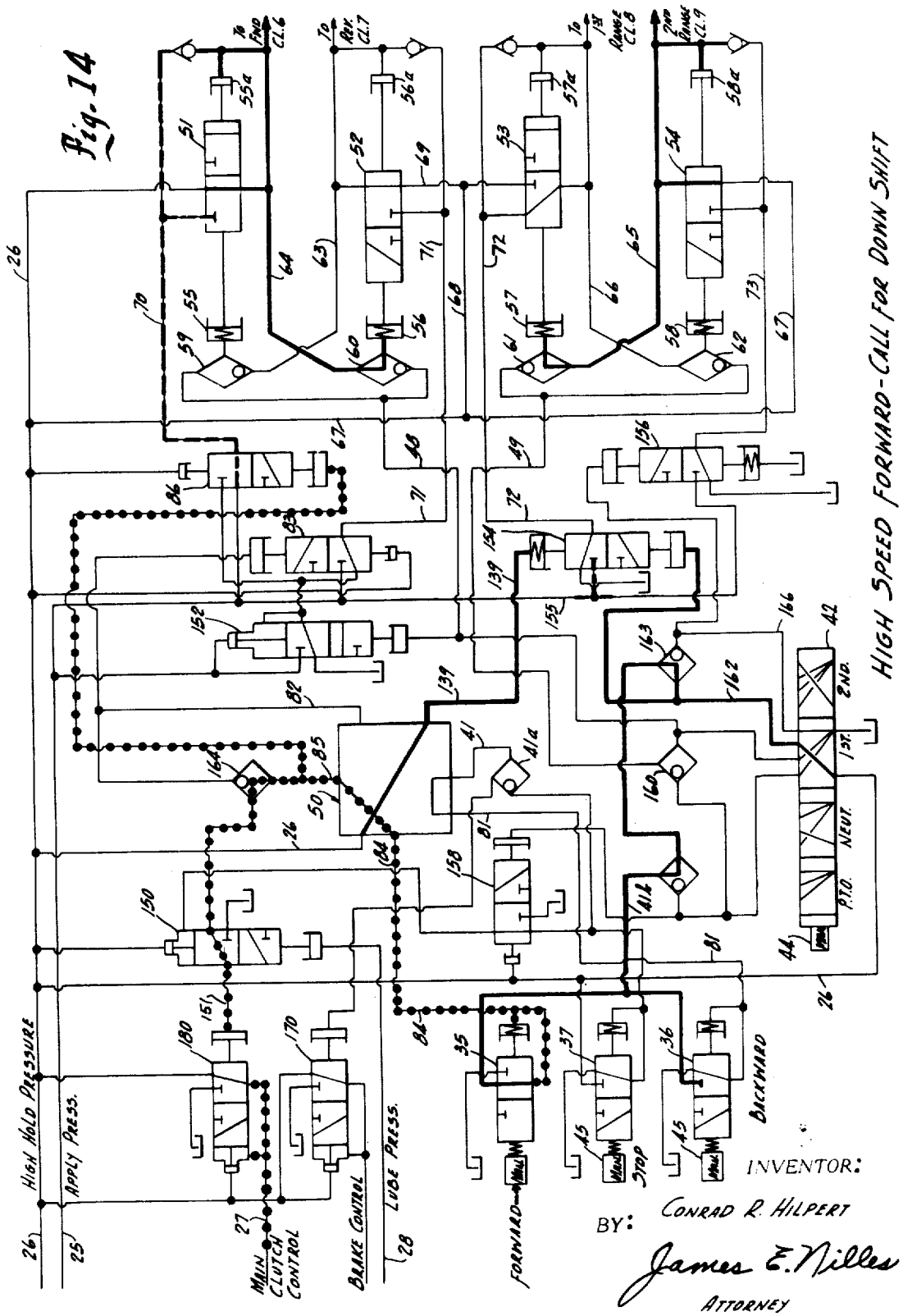

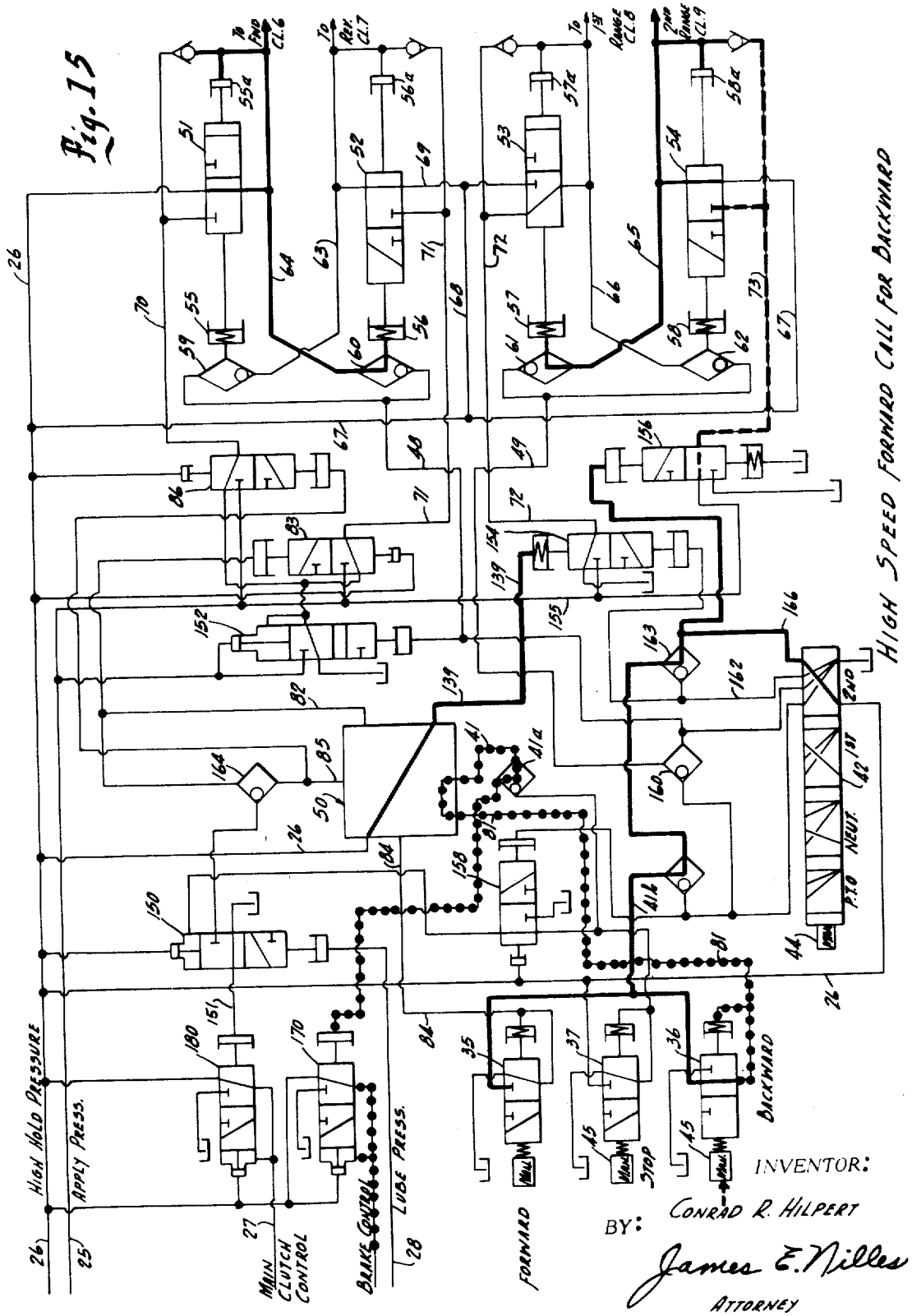

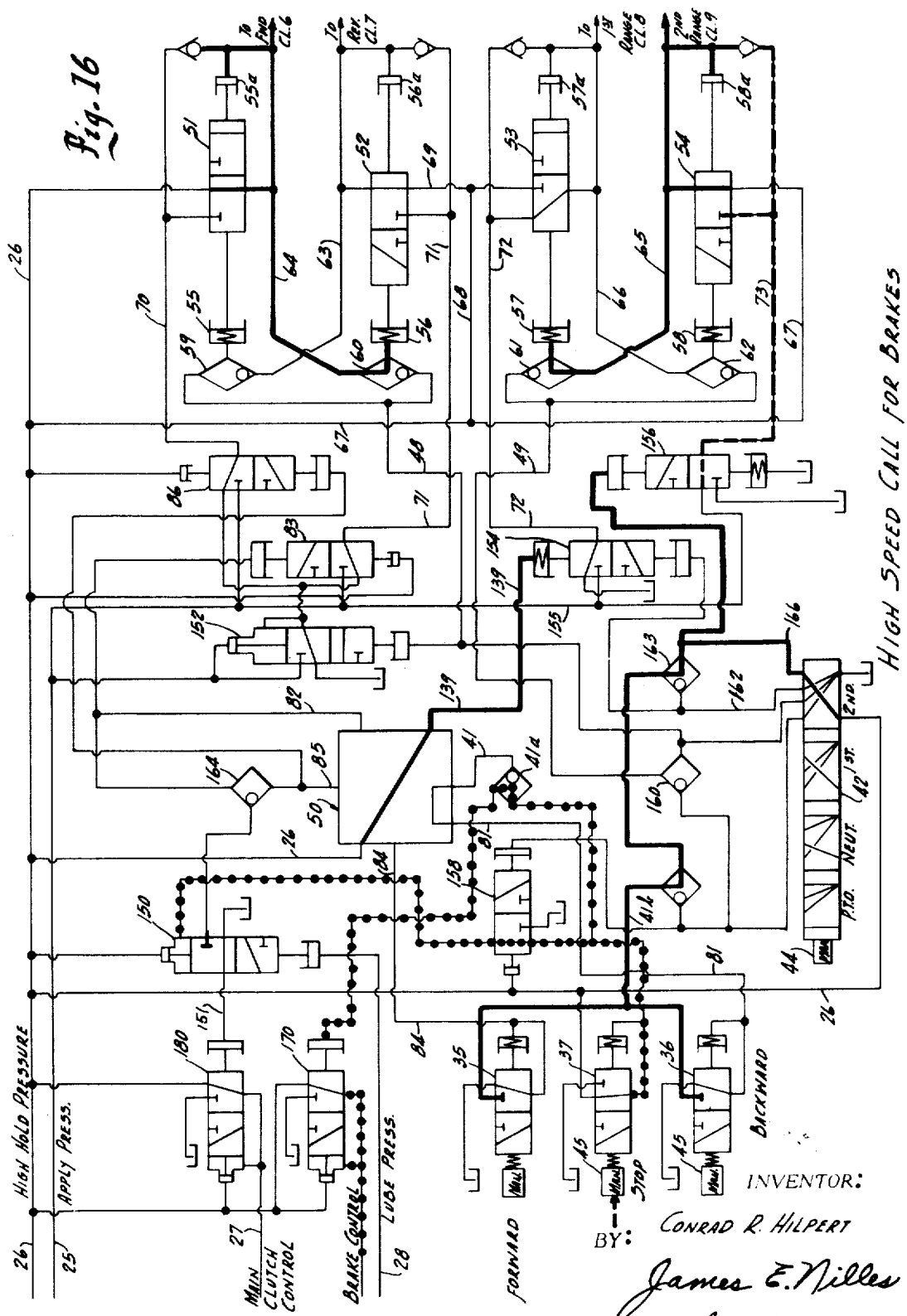

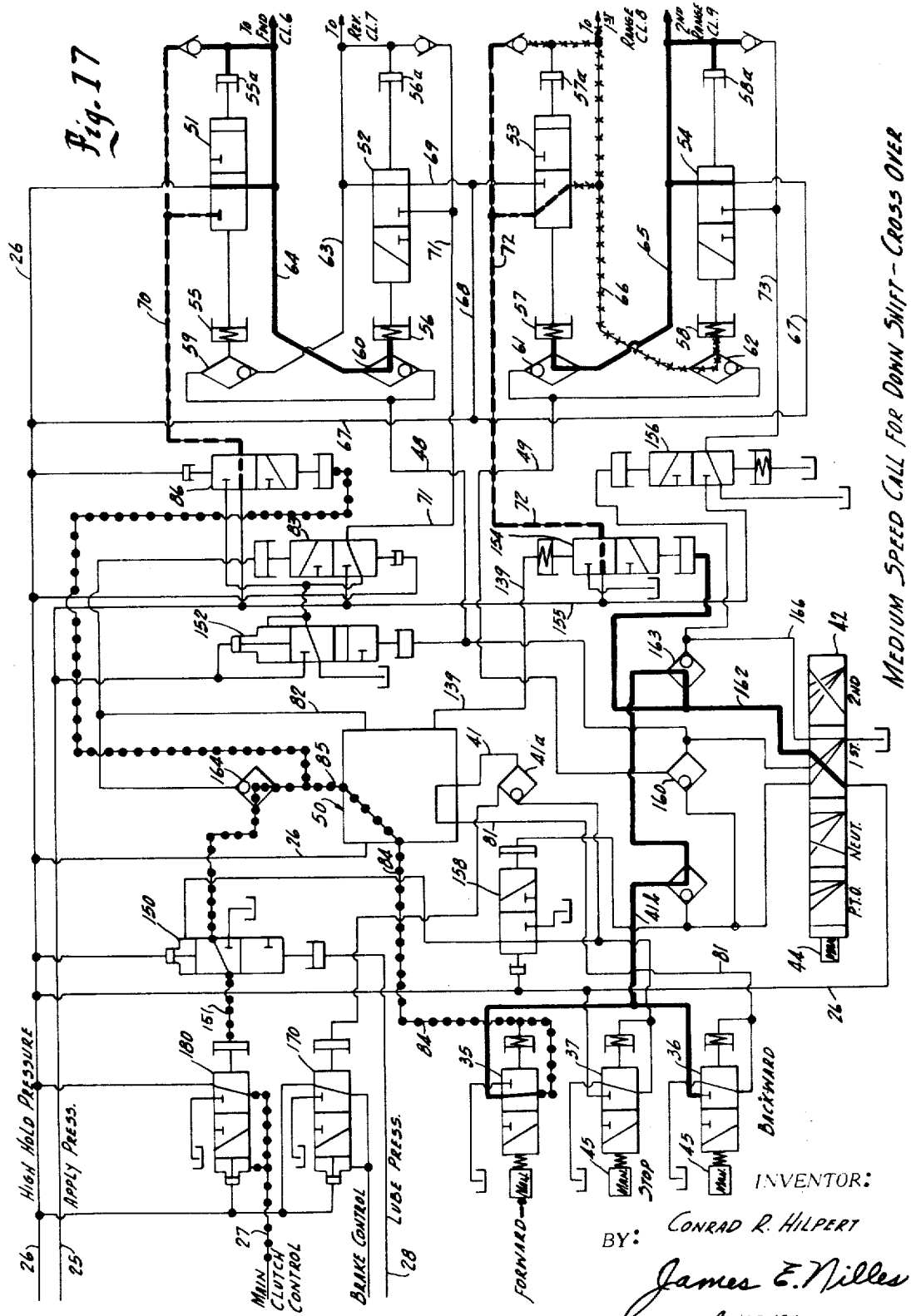

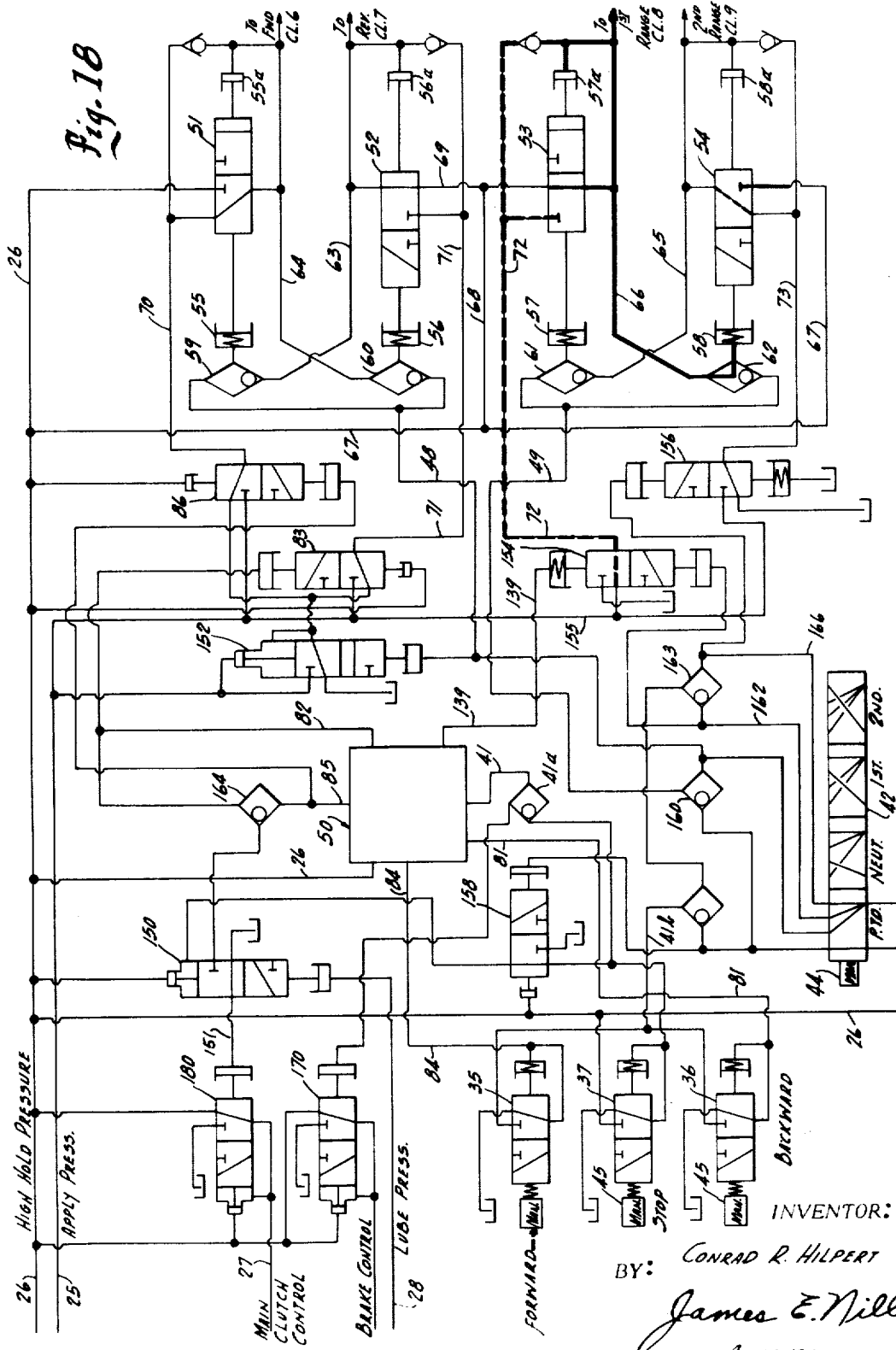

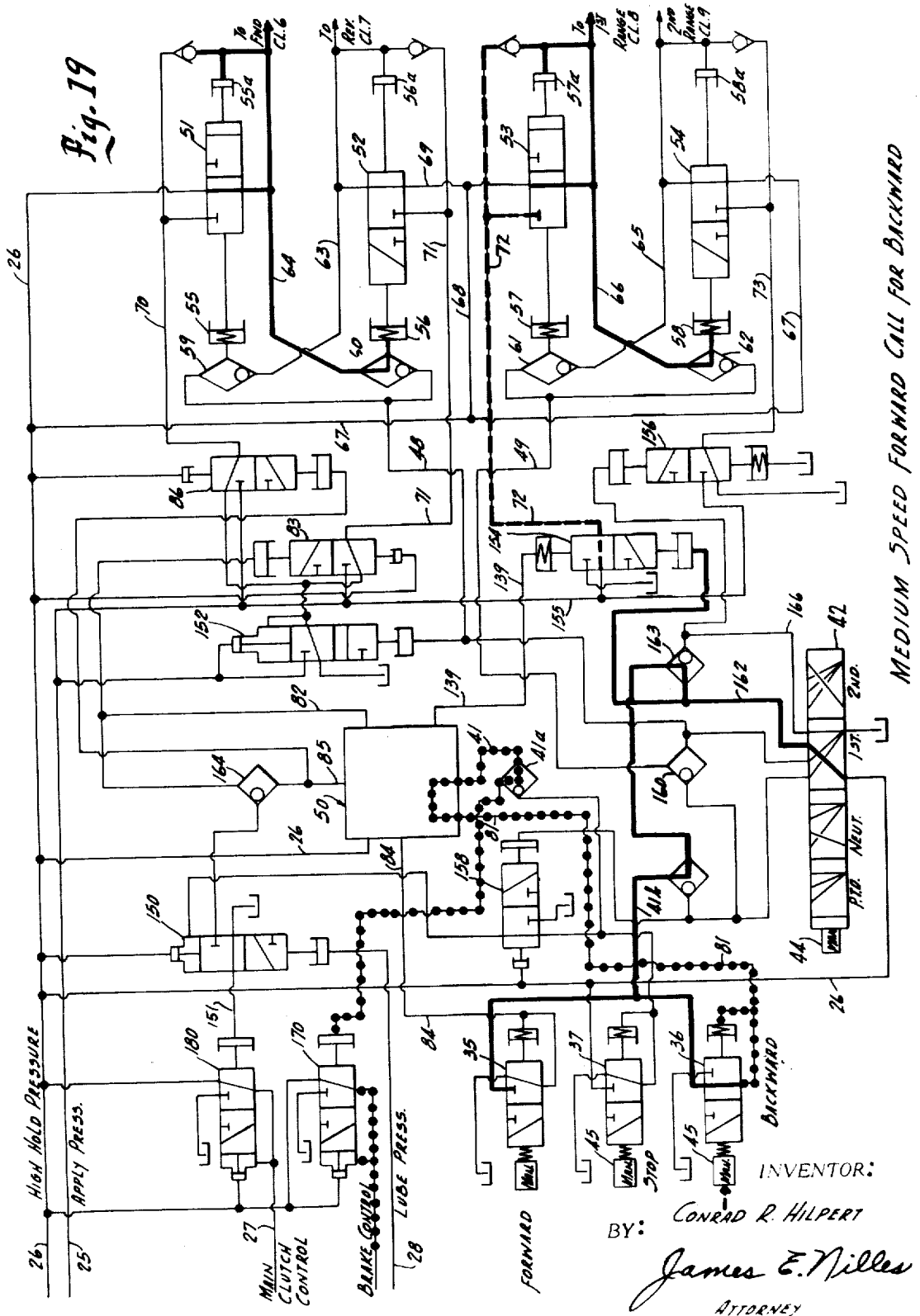

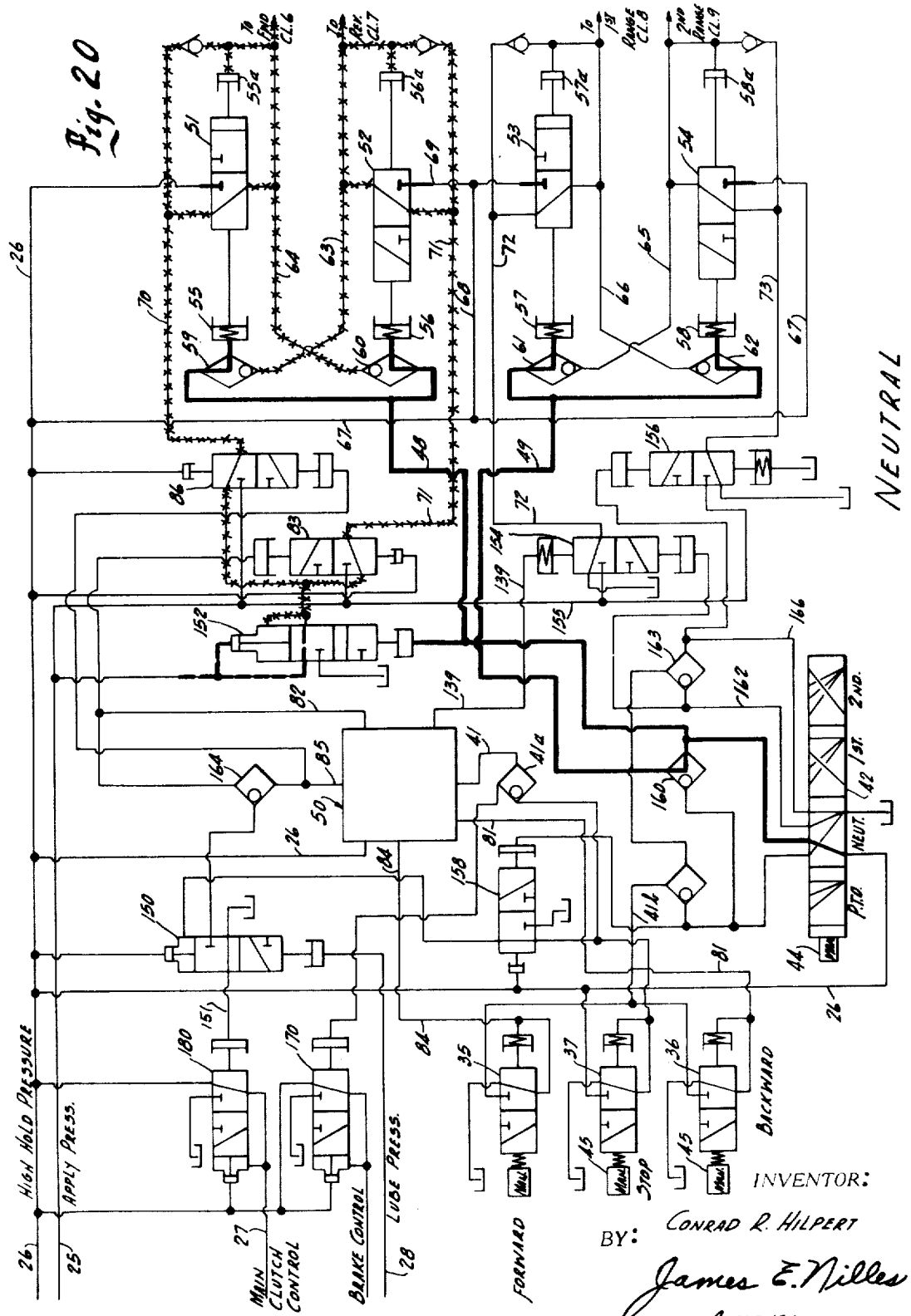

FLUID POWER CONTROL SYSTEM FOR VEHICLES

BACKGROUND OF THE INVENTION

The invention pertains to fluid power control systems for vehicles, for example, those which operate in either direction, such as front end, earth moving loaders or the like. These control systems control the shifting of fluid clutches for changing the direction of travel of the vehicle as well as its speed in either direction. The transmissions used with such vehicles also include a torque converter which is driven from a power source through a modulatable and fluid actuated friction clutch. Considerable heat is generated in the clutches when shifting from one to the other is made at excessive vehicle speeds, and the control system of the present invention substantially eliminates this heat generating, as well as eliminating a second source of heat which is generated during the neutral gear position and which is due to the inertia of the moving parts of the transmission. This second source of heat in the clutches is caused by slow shifting of the clutches which permits the power source to store inertia energy in the input parts and permits the driven vehicle to be without driving torque and thereby slow down, thus increasing the heat dissipation for speed range to speed range shifts.

SUMMARY OF THE PRESENT INVENTION

The present invention provides a fluid power control system for a vehicle which has brake, forward, reverse, and speed range clutches, and which vehicle is driven from a source of power, through a torque converter which in turn is controlled by a fluid actuated and modulated main friction clutch. The control system provided by the present invention includes inhibitor valve means which functions to inhibit the shifting of the clutches between forward and reverse directions and also inhibits speed gear shifting in a downward direction above a predetermined speed. The inhibitor valve means functions to actually apply the vehicle brakes when the operator has called for a reversal of vehicle direction or when the operator has called for a downshift of above a predetermined vehicle speed. In other words, the inhibitor valve means are effective when a call for reverse direction at excessive speeds is made and the modulated main clutch is disengaged, and the operator automatically applies the brake clutch.

The control system provided by the present invention also includes cross-over valves which are connected with the direction clutches and the speed change clutches so that when a shift from one clutch to another is to be made, the clutch which had been engaged is held in engagement until the newly selected clutch is commencing to be or is at least partially engaged, and then the clutch which has been engaged is released. The control system eliminates heat generation which is otherwise caused by slow shifting which in turn permits the vehicle power source to build up inertia energy in the power input parts, such as the flywheels, main clutch, and torque converter. The cross-over valves provided by the present invention eliminate the heat build up which is due to the conventional neutral position of the gears, and the cross-over valves are effective regardless of how slowly the clutches are shifted.

The present invention provides a fluid power control system for a vehicle which insures complete heat control of the clutches and torque safety of the transmission, combined with complete operator control and smooth shifting in either direction and at all speeds.

These and other objects of the present invention will appear hereinafter as this disclosure progresses, reference being had to the accompanying drawings.

BRIEF DESCRIPTION OF THE DRAWINGS

FIG. 7 is a schematic view of a power transmission for a vehicle and with which the control system of the present invention is usable;

FIGS. 9 through 20 are diagrams showing the portions of the circuitry that are used for various shifting operations, as follows:

FIG. 9 is a circuit showing the power take off operation;

FIG. 10 is a circuit showing the low speed forward steady operation;

FIG. 11 is a circuit showing the low speed forward at the time of a demand for backward motion;

FIG. 12 is a circuit showing the cross over terminating;

FIG. 13 is a circuit showing the high speed forward steady;

FIG. 14 is a circuit showing the high speed forward and call for downshift;

FIG. 15 is a circuit showing the high speed forward call for backward;

FIG. 16 is a circuit showing the high speed call for brakes;

FIG. 17 is a circuit showing the medium speed called for downshift;

FIG. 18 is a circuit showing the cross over terminated;

FIG. 19 is a circuit showing the medium speed forward and call for backward; and FIG. 20 is a circuit showing neutral.

DESCRIPTION OF THE PREFERRED EMBODIMENT

Figure 1:
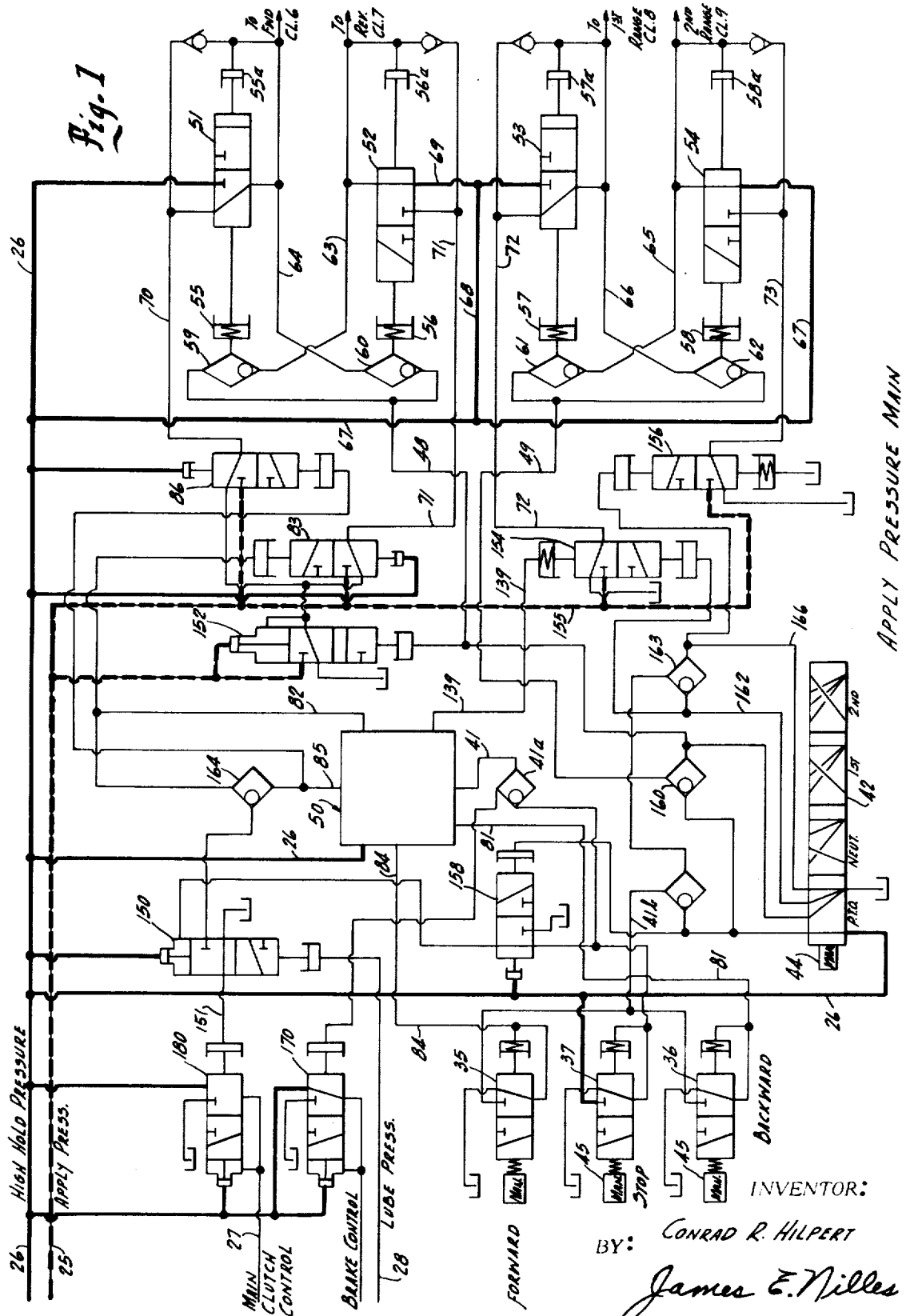
FIG. 1 is a fluid circuit diagram embodying the present invention and showing the inhibitor valve means as a box.

The present invention will be shown and described as applied to a power transmission for a vehicle V(FIG. 7), including a source of power such as an internal combustion engine E having a flywheel 1 and which drives a torque converter TC which in turn is controlled by a fluid operated, modulatable friction type clutch 2. The torque converter shown for purposes of illustrating the invention is of the stationary housing, single stage, single phase type shown in the U.S. Pat. No. 3,360,935, issued Jan. 2, 1968, and entitled "Hydraulic Torque Converter." The modulated friction type clutch may be of the shown shown in the U.S. Pat. No. 3,352,395, issued Nov. 14, 1967 to C. R. Hilpert entitled "Friction Clutch having Centrifugally Operated Valve Means," or in the U.S. Pat. No. 3,358,796, issued Dec. 19, 1967 to C. R. Hilpert. The torque converter then furnishes power through the gear change input shaft 4. The gear shift mechanism 5 may be one of several types, such as U.S. Pat. No. 3,447,397, issued June 3, 1969 to Black, et al., but is shown here for purposes of illustrating the invention as including a fluid actuated, forward direction clutch 6, and a fluid actuated rearward direction clutch 7, either of which receives power from the input shaft 4. Power is then delivered through any one of a number of fluid actuated, speed selection clutches and for the present purposes, two such speed selection clutches have been shown, namely a low range clutch 8, and a high range speed clutch 9. Power is then delivered from gear shift mechanism 5 through the shafts 10 and to the load of the vehicle V on which the transmission is mounted, such load being for example, the pairs of ground engaging, driving wheels 11 and 11a of the vehicle. The front wheels 11a are steered, for example, by a steering wheel 12, and disc brakes 13 are provided for all the wheels.

Figure 3:
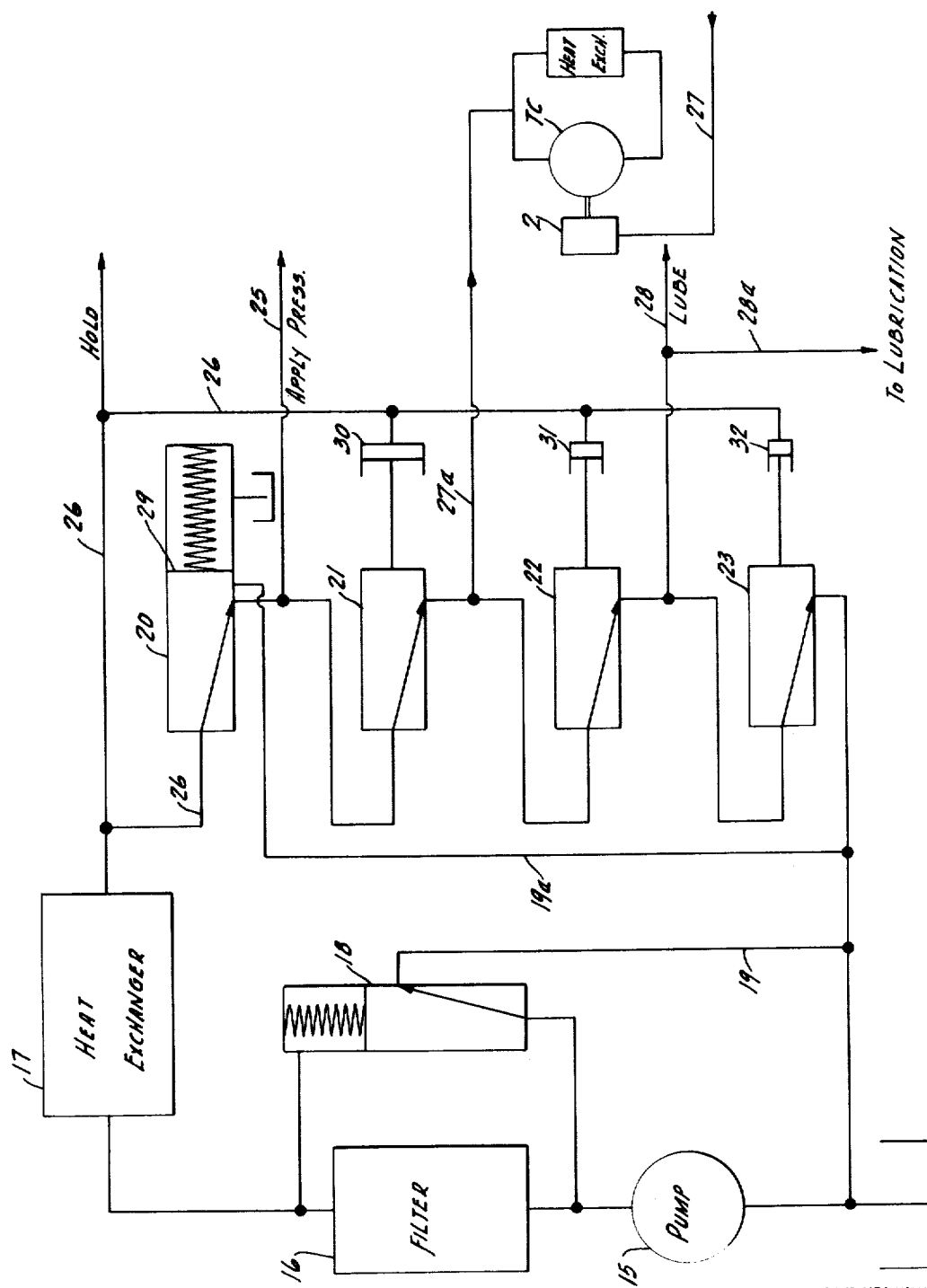
FIG. 3 is a fluid circuit diagram of one form of the fluid pressure supply circuit which is connected to the circuit of FIG. 1.

Referring to the circuit shown in FIG. 3, fluid under pressure, such as oil, is provided by a pump 15 mounted on the vehicle and driven by its source, the pump delivering the pressurized fluid through the filter 16 and heat exchanger 17. A certain amount of fluid may also be diverted through a filter pressure relief valve 18 which limits the maximum pressure across the filter and dumps the fluid via conduit 19 to the pump inlet. In this manner, the system is not loaded with dirt and also the pump cavitation is reduced on cold starts. The pressure fluid then flows through a high pressure regulator valve 20 which also acts as a cold oil relief valve and can dump the oil to the pump inlet via conduit 19a. Valve 20 is a spring loaded relief valve. Valves 21, 22 and 23 are piston loaded relief valves having high pressure at their pistons via line 26. The pistons of valves 21, 22 and 23 get progressively smaller, in that order, as shown in FIG. 3. These valves act to regulate the percentages of the holding pressure of the system which is set by valve 20. Valve 21 is the pressure apply valve and can be set so that about 80 percent of the high holding pressure is delivered by it, and the settings of valves 22 and 23 are values which are necessary to obtain the desired pressure they are to furnish. Valve 20 can be set to open at 200 p.s.i. and be at full flow at about 205 p.s.i. for example. This valve would begin to dump at cold oil relief at about 225 p.s.i. Valve 21 will hold pressure at line 25 about 79 percent of that pressure at line 26, namely about 160 p.s.i.

Valve 22 will hold pressure at line 27 (which conducts fluid to the torque converter) at about 60 p.s.i. Then, for example, valve 23 will hold pressure at line 28 (which goes to the lubricating system) at about 22 p.s.i. Damping of valves 20, 21, 22 and 23 can be accomplished by dashpost action of the spring follower 29 of valve 20, and the sump and pressure areas on each side of plungers 30, 31 and 32 which are acted upon by the pressure in line 26.

Thus, fluid lines or conduits 25, 26 and 28 furnish pressure at various amounts to the circuit diagram shown in FIG. 1.

Line 27a, located between valves 21 and 22 furnished pressure fluid to the toroidal circuit of the torque converter. Line 27 connected the fluid actuated and modulatable main clutch 2 to the clutch control valve 180 (FIG. 1) as will appear later. Line 28a furnishes lubricating pressure fluid to the various parts which require lubrication, such as gears, bearings and other parts which need cooling.

Figure 6:
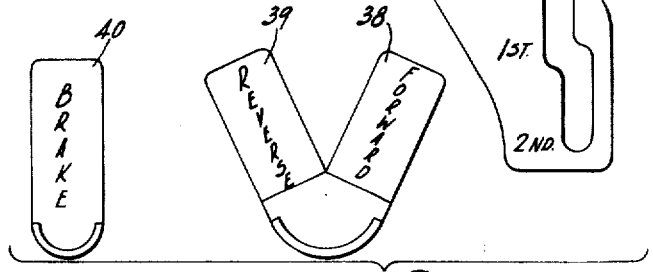
FIG. 6 is a schematic view of the foot control and hand shifting format for operating the various brake, forward and reverse foot operated valves, and the change speed gear valves.

Referring now to FIG. 1, a forward direction valve 35, a rearward direction valve 36, and a brake or stop valve 37 are provided in the circuit and are located respectively under and actuated by the foot pedals 38, 39 and 40, respectively, shown in FIG. 6. The pedals 38, 39 and 40 are operated by the foot of the operator, stop pedal 40 is for actuating the brakes to be described and thereby stopping the vehicle, which pedal is operated by the operator's left foot, while pedals 38 and 39 for causing the vehicle to move in a backward and forward direction are selectively operated by the operator's right foot.

Figure 5:
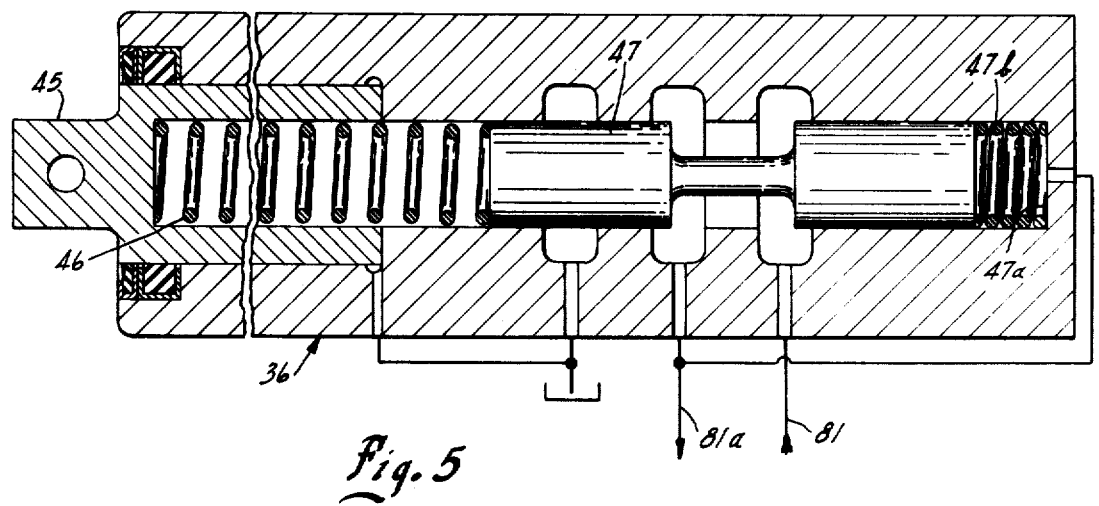
FIG. 5 is an enlarged, more or less schematic view, of each of the foot pedal valves 35, 36 and 37 shown at the lower left end of the FIG. 1 circuit.

The foot pedals 38, 39 and 40 are connected to the plungers 45 (FIG. 5) of their respective valves 35, 36 and 37. Pushing the selected pedal compresses the spring 46 of the corresponding valve, which in turn causes the valve spool 47 to shift, for example, to open the supply pressure line 81 to the control pressure line 81a. The inhibitor valve 80 is also connected via pressure line 41 (FIG. 2) to the brake valve 37 via a check valve 41a (FIG. 1) and conduit 41b.

Fluid pressure feedback occurs in the chamber 47a at the right hand end of valve spool 47 and causes control pressure to be proportional to the bias of spring 46 in excess of that in spring 47b in chamber 47a. Spring 47b insures that the spool 47 will go to full dump position.

As will appear, the vehicle, can move forward or rearward in various speeds. A speed range selector valve 42 is also shown in FIG. 1 and this is manually operated by the vehicle operator by means of the control lever 43 (FIG. 6) which is attached to the spool 44 of the selector valve 42 in the known manner.

The vehicle, such as a wheeled, front end loader, shown in FIG. 7, would be steered by the steering wheel 12. As mentioned, the left foot of the operator operates the stop pedal which applied the brakes and which releases the modulated main clutch 2 regardless of other pedal positions. The right foot of the operator actuates the "accelerator" pedals 38 and 39 which gives the vehicle actuation in either direction as mentioned. The control circuit is such that full speed reversals are the normal desired operation and by means of the present invention can be accomplished on any grade without excess heat in the clutches. The invention, as will appear, also provides smooth and quick reversal which is entirely under positive control of the operator.

The range selector valve 42 is also hand operated through lever 43, and the shift between speed ranges is also accomplished with a minimum of clutch heat being generated. Furthermore, reverses and downshifts of the transmissions are inhibited at excess speeds as will appear.

CROSS-OVER VALVE MEANS

Figure 4:
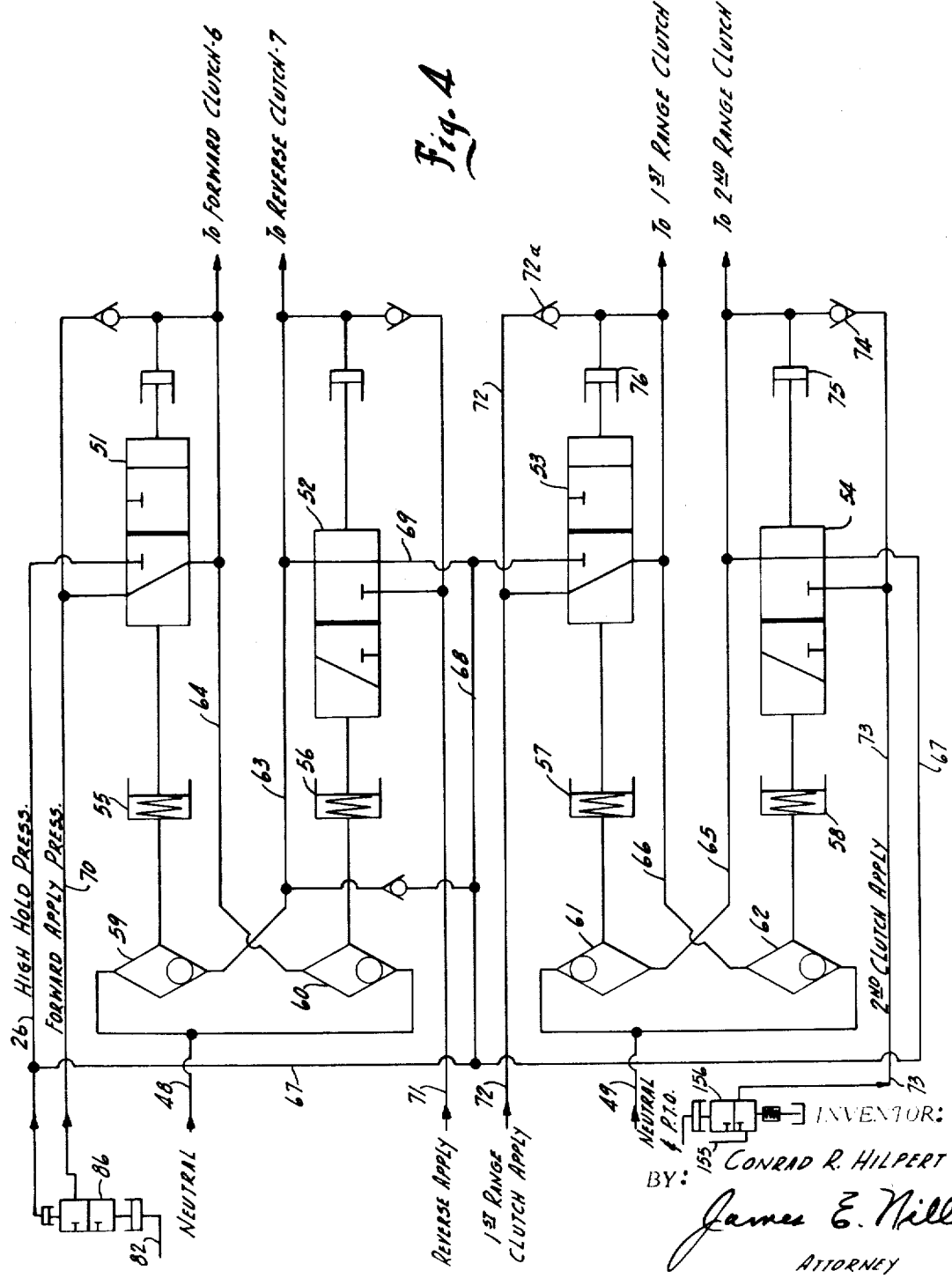
FIG. 4 is an enlarged view of the right hand portion of the FIG. 1 circuit, namely, the cross-over valve means.

The cross-over valve means is shown at the right hand portion of FIG. 1, and is shown in greater detail in FIG. 4. The object of the cross-over valve system is to hold the engaged, "old clutch" in the engaged position until the piston of the "new clutch" which is about to be engaged has stopped moving and has begun to press on the stock of clutch plates to commence clutch engagement. When this has happened in the newly engaged clutch, the old clutch is cut off of apply pressure and sumped, that is, released. The cross-over valve means produces cross-over shifts between forward and reverse directions and also between the first speed range and the second speed range. A neutral position of the gear shift mechanism is accomplished by pressurizing the neutral conduits 48 and 49 (FIG. 1) thus shifting the internal shiftable portion or spool of all of the fluid piston operated and spring returned cross-over valves 51, 52, 53 and 54 (FIG. 4) to the neutral position, as will appear.

Referring to FIG. 4, the spring biased large area pilots 55, 56, 57 and 58 of valves 51, 52, 53 and 54, respectively, and are referred to an "anti-memory" springs which are relatively weak and act to return the valves to neutral when all of the pressure on the vehicles is off, as when the vehicle shuts down. Valves 51, 52, 53 and 54 are all essentially the same in construction, but with effective cross sectional area ratios of approximately 50 per cent or otherwise as desired for the best required pressure cross-over point, as will appear.

FIG. 4 also includes double check ball valves 59, 60, 61, and 62 connected to their respective neutral conduits 48 and 49. It will be noted also that double check ball valves 59 and 60 are connected by lines 63 and 64, respectively, to valves 52 and 51, respectively, and also the reverse clutch 7 and forward clutch 6, respectively. Likewise, double check ball valves 61 and 62 are connected via conduits 65 and 66, respectively, to valves 54 and 53 and also to the high speed or second range clutch 9 and the low speed or first range clutch 8.

Still referring to FIG. 4, the high pressure hold line 26 can provide holding pressure via conduits 67, 68 and 69 to conduits 65 and 63, and also via valves 51 and 53, respectively, to conduits 64 and 66. Forward apply pressure is provided to the circuit of FIG. 4 from conduit 70, reverse apply pressure is supplied via conduit 71, apply pressure for the first gear range is provided via conduit 72, and pressure fluid for the high gear range is provided by conduit 73.

The operation of the cross-over valve means is as follows. Assume high speed clutch 9 has been applied previously by shifting lever 43 (FIG. 3) to second position. High holding pressure has been conducted from the pressure line 26 and to conduit 65 that leads to the clutch 9, and thereby caused its engagement. Clutch apply pressure at line 73 is also available at line 65 by first passing through the check valve 74, but since the pressure at line 26 is equal or higher than the pressure at conduit 73, pressure at 73 has no real effect in this condition of a continuous call for engagement of the high range clutch 9. High holding fluid pressure is also present at the large area end of valve 53, namely, at the pilot 57, first passing the double check valve 61 from line 65. This pressure at the pilot 57 holds the valve 53 firmly in the position shown wherein it connects line 66 with the first apply conduit line 72, but with the manual selector 43 (FIG. 6) in the second position, the first apply pressure line 72 is opened to sump.

Assume now the the operator calls for a shift to the first range clutch by moving the selector 43 to the first position. Pressure is removed and line 73 is opened to sump. Pressure is applied at the first apply pressure conduit 72 and fluid flows via valve 53 and through the check valve 72a to line 66 which ultimately causes engagement of the first range clutch 8. Holding pressure at line 26 keeps the high range clutch 9 at full pressure via valve 54 and this pressure at the area of pilot 57 maintains valve 53 in the position shown.

When the piston of the low range clutch 8 begins clutch engagement and then stops moving, the pressure at line 66 builds up towards the maximum available at the selector 42 and at conduit 72. This pressure at 66 is also applied at pilot piston 58 via the double check valve 62. The high holding pressure from line 26 is applied at line 65 via valve 54 and is also applied at the small piston pilot 75. The area ratio between piston pilot 58 and small piston pilot 75 defines the value to which the pressure at line 66 must rise, whereupon valve 54 will begin to move from piston pilot 58 toward the small piston pilot 75. This is the pressure where the driving torque "crosses over" from the second clutch 9 to the first clutch 8. This pressure is designed such that the new clutch 8 (the low range clutch in this case) is applied and slipping at a low torque value because of low pressure and its slipping (kinetic) coefficient of friction, and will remain until valve 54 is driven by pressure at pilot 58 to its other position where line 65 is opened to sump via valve 54 and the selector 42. Thus, the pressure at spring pilot 57 is opened to sump also and the pressure at the small piston pilot 76 of valve 53 snaps valve 53 to the position connecting the high holding pressure in line 26 to conduit 66 and the low clutch 8 is instantly raised to its highest torque capacity. The ratio of area such as pilot 58 and pilot 75 and the selection of apply pressure fed to the lines 72 and 73 allows the torque to cross-over from one clutch to the other regardless of the flowness of the clutch design.

The drive line of the transmission is not permitted to be in neutral while one clutch is released and the other is trying to become engaged. Since the system is not based on timers but instead on fixed pressure ratios, the reduction of pump flow and increased leakage of wear will not change this ability to change torque instantly when the new clutch is ready to hold torque. When neutral is desired, the operator places the selector valve 42 in neutral and pressure is then applied to the neutral lines at 49 and 48. This pressure appears at piston pilots 55, 56, 57, and 58, and acts to drive the valves 51, 52, 53 and 54, to thereby sump all clutches via lines 70, 71, 72, and 73.

The springs shown in pilots 55, 56, 57 and 58 are optional and can be very weak. Their only purpose is to return all of the valves to neutral when the vehicle is shut down while in some gear. In the event that the mechanics of the control are such that the selector valve is in neutral when starting, these springs may be unnecessary.

The check valves such as valve 74 may also be eliminated if the design of the valves 51, 52, 53 and 54 are such that a slight overlapping of porting is possible because of sufficient oil supply in line 26. However, the use of check valves such as 74 allows greater underlap of porting in the valves 51, 52, 53 and 54.

INHIBITOR VALVE MEANS

Figure 2:
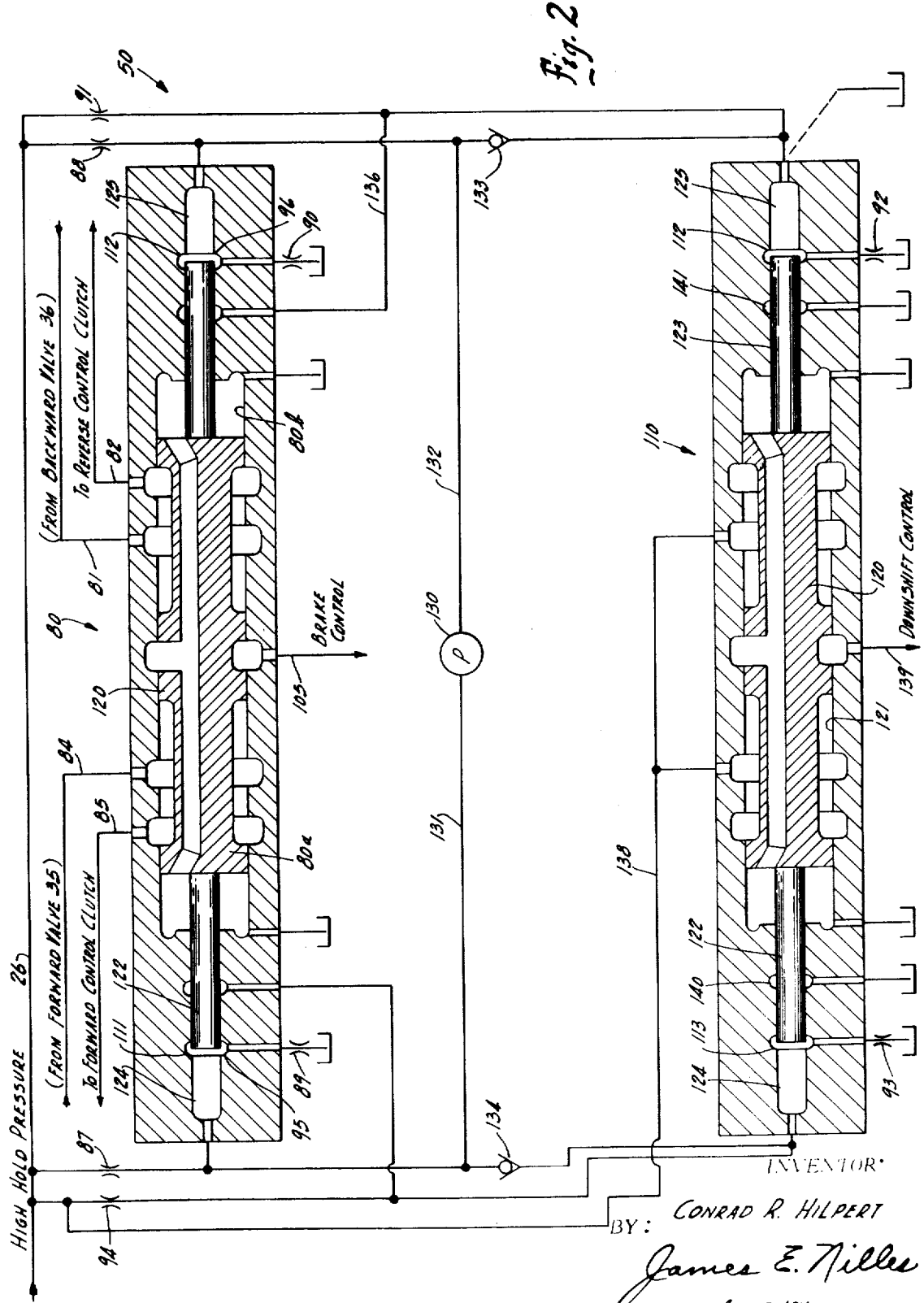
FIG. 2 is a more or less schematic diagram of the inhibitor valve means which is simply shown as a box in FIG. 1.

Reference will now be made to the inhibitor valve means 50 as shown in detail in FIG. 2. This inhibitor valve means includes a reverse inhibitor valve 80, and a downshift inhibitor valve 110 of similar construction.

Valve 80 has a shiftable element in the form of spool 80a, and a fluid operated piston 122 and 123 abuttable against either end of the spool 80a for shifting the latter in one direction or the other, depending on the fluid pressure in the respective piston chamber 124 and 125.

When the valve 80 is inhibiting, the operator's direction foot pedals 38 and 39 and their respective valves 35 and 36 are, in effect, transferred to the brake control fluid line. In this manner, a call for a reversal of directions at excessive vehicle speed merely allows the operator to unknowingly, but controllably apply the brakes of the vehicle.

Fluid line 81 connects the inhibitor valve 80 to the foot operated reverse valve 36. Fluid line 82 conducts pressure fluid from the inhibitor valve 80 to the reverse clutch via a slave valve 83 which is connectible to the reverse fluid apply line 71. Line 83 connects the inhibitor valve 80 to the pedal operated, forward valve 35. Fluid line 85 then connects the inhibitor valve 80 to the forward clutch via a direction flow slave valve 86.

Various orifices are formed in the lines, such as orifices 87, 88, 89 and 90 and these orifices should be of equal size and of a sufficient size so that the reverse inhibitor speed is low enough to prevent damage to the clutches. Other orifices 91, 92, 93 and 94 should be of the same size as one another and also of a sufficient size that their flow characteristics added to those of orifices 87, 88, 89 and 90, act to set the downshift speed shift at a safe limit.

The ports 95 and 96 at either end of the valve 80 could be opened or closed at zero speeds.

As mentioned, the inhibitor valve means 50 also includes a downshift inhibitor valve 110. Valve 110 puts out full line pressure at excessive speed, or puts out sump pressure at speeds which are suitable for downspeed shifting.

As mentioned, the construction of the downshift inhibitor valve 110 is similar to the construction of the reverse inhibitor valve 80 and it includes a central spool 120 shiftable in the bore 121 and having a smaller piston 122 bearing against its left end and another small piston 123 bearing against its right end. A chamber 124 is formed adjacent the outer end of piston 122 while another chamber 125 is formed adjacent the outer end of piston 123. The shiftable valve elements 120 and their pistons 122 and 123 are shown in the non-inhibiting position and are of the free floating type. Consequently, the pressure at the chambers 124 and 125 must be equal or the valves will be driven to their extreme positions.

The inhibiting valve means also includes a ground driven pump 130 which can pump fluid through line 131 or 132 or vice versa depending upon which way the vehicle wheels are moving. When the velocity of the vehicle is zero, the valves assume the non-inhibiting position shown.

As mentioned, downshifts must be prevented (inhibiting) if the shift will cause over-speeding of the rotating parts ahead of the transmission. Downshift should also be inhibited if the shift causes the turbine of the torque converter to be driven beyond racing.

Assume the pump 130 begins to pump fluid from line 131 to 132. The check valve 133 forces fluid flow from the pump to be routed into chamber 125 of valve 80, in addition to that from orifice 88. This added flow into chamber 125 causes an equal displacement of valve element 120 of the valve 80, thereby closing off orifice 89.

As long as the spool 80a of valve 80 is free to move from chamber 125 towards chamber 124, the pump flow is effectively "shorted" out, causing no reduction in flow through the combined outlets 89 and 93. As piston 122 of valve 80 shuts off orifice 89, the flow through orifice 87 tries to go through check valve 134 to the chamber 124 of valve 110 and then to orifice 93, but check valve 134 checks shut and all the flow through orifice 87 must go through the pump 130 or orifice 89. When the check valve 134 closes, the pressure in chamber 124 of valve 80 rises, permitting orifice 89 to dump fluid.

In the event the pump 130 speeds up, then all flow through orifice 87 will be taken by the pump, and valve 80 will move to the extreme position, (to the left, as viewed in FIG. 2), thereby opening chamber 125 to conduit 136. Reversing is inhibited, as the line 82 is opened to sump through valve bore 80b, and the reverse pedal 39 and its valve 37 are connected to the brake control line. Thereby above a certain speed, a demand by the operator for a reverse direction is actually an application of the brakes. Additional speed of the pump causes the flow through the pump to finally equal the combined flow of orifices 87 and 94, the valve 110 is moved, allowing flow from line 138 to line 139, providing a downshift at higher speeds.

Should the pump 130 speed be very high, excessive pressures in lines 131 and 132 are prevented by ports 140 and 141. (See FIG. 2). Extreme travel of valve piston 120 of valve 110 opens port 140 or port 141 to the sump, venting excessive flow from pump 130.

It will be noted that movement of the valves 80 and 110 is accomplished with essentially no pressure change across the pump 130. Thereby the system is very accurate and nearly independent of wear and "-slip" of the pump 130. Since the pump inlet and outlet are always fed by high pressure fluid and never fall below 50 percent of line pressure, the system is not affected by entrained air or pump suction cavitation. The sizing of the orifices determines the speeds at which shift inhibiting will take place.

OTHER VALVES

Figure 8:
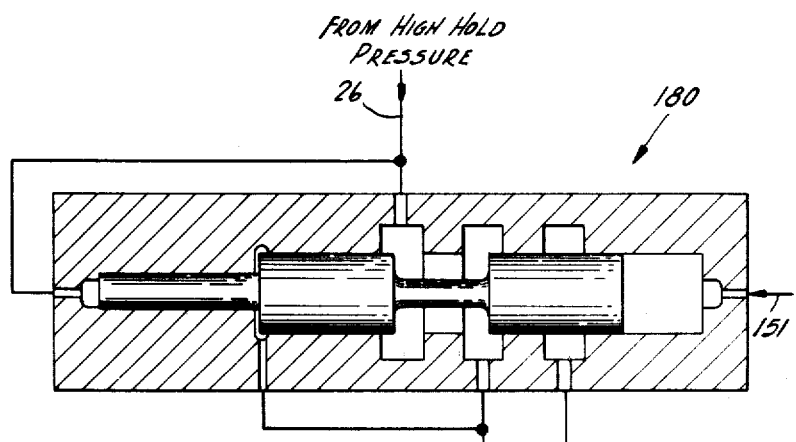
FIG. 8 is an enlarged, schematic cross sectional view of the main clutch control valve 180.

Referring generally now to FIG. 1, the valve 150 is the lubrication safety valve whereby if the lubrication pressure falls below a certain predetermined percentage of the high pressure, the modulated clutch 2 is released, thus removing power from the system. Line 151 connects this valve 150 with the main clutch control valve 180 (FIGS. 1 and 8) to be referred to later.

Valve 152 is the "dead neutral" valve which allows both forward and reverse clutches to be applied, at low pressure when neutral is selected thus preventing creep and heat in the clutches in a neutral to first range or second range shift. The valve 152, which is a pilot operated pressure reducing valve, allows the modulated main clutch 2 to be spring applied to some very low engagement for rapid response and have no jolt or creep caused by turbine rotation while in neutral.

Another slave valve 154 is provided between the apply pressure line 155 and line 72 and is similar in construction and function to valve 83. Line 139 from the inhibitor valve means is also connected to the actuating end of valve 154. Valve 154 allows inhibit pressure to prevent a downshift by preventing the sending of apply pressure to the low range clutch.

Another slave valve 156 is provided between the apply pressure line 155 and the line 73 and it is similar in construction to the valve 86. Valve 156 allows main apply pressure to be directly applied to clutch 9 from line 25 and 155.

The direction slave valves 86 and 83 have their pilot pistons of an area ratio such that when a low (for example, 10 percent) percentage of "high holding pressure" in line 26 is applied to the larger pilot piston, the valve causes flow from main apply pressure via valve 152 directly to the corresponding clutch 6 or 7. These valves 86 and 83 allow the initial rise of pressure from the forward or backward pedal valves 35 and 36 to select and apply the direction clutches as desired. The transmission is thus shifted into the desired direction before the main modulated clutch 2 has been applied to any significant extent.

The vehicle brakes and modulated clutch 2 are controlled by slave valves 170 and 180. Valve 180 is shown in detail in FIG. 8 and valve 170, and the other valves 51, 52, 53, 54, 83, 150, 152, 154 and 158 are also similar but have different conduits connections. These valves 170 and 180 are connected quite similarly to valve 152, that is, in a "feedback" manner such that the pressure out is exactly equal to the operator variable pressure from the forward, backward, and stop pedal valves 35, 36 and 37. These slave valves 170 and 180 permit the rapid response of the brakes and modulated clutch by applying "high holding pressure" to the brakes and modulated clutch. The small pilot piston biases valves 170 and 180 "off" until the pressure from valves 35, 36 or 37 has reached a low percentage of the high holding pressure (for example 15 percent) thus allowing the low bias of valves 83 and 86 (for example 10 percent) to cause direction selection before application of power to the transmission by the modulated clutch. The use of pressure biases rather than spring biases allows the system to be operative over wide ranges of vehicle pressure supply.

In other words, valves 83, 86, 154, 156, 180 and 170 are all slave valves and their construction is quite similar to one another.

With the circuit diagram as shown in FIG. 1, high holding pressure fluid is present in the one set of heavy fluid lines which include line 26 and lines 67, 68, and 69. More specifically, under these circumstances, high pressure fluid is directed to valves 170, 180, 37, 158, 150, the inhibitor valve means 50, valve 83, valve 86 and valves 51, 52, 53, and 54. In addition, apply pressure is also present, as shown in the heavy, broken set of lines, such as lines 25 and 155, and at valves 152, 86, 83, 154, and 156.

FIGURES 9–20

Referring now to FIGS. 9 to 20 inclusive, which show diagrams similar to FIG. 1, high holding pressure and apply pressure are present in all of these diagrams shown in FIGS. 9 to 20 in the same manner as they are present as shown in the FIG. 1 diagram. For purposes of clarity however, the high holding pressure lines and the apply pressure lines as shown in FIG. 1 are not repeated in FIGS. 9 to 20. Instead, only those additional conduits in use and pressurized for the various operations are shown additionally in FIGS. 9 to 20 inclusive.

A brief description of the circuitry used in each of the circuits used in FIGS. 9 to 20 for the various operating conditions will now follow, it being understood, as mentioned above, that high holding pressure and apply pressure are present in all of these diagrams as they are in FIG. 1.

Referring now to FIG. 9, this illustrates the circuit used for power take off and the heavy lines shown are those having steady pressure. The lines having variable pressure at the control of the operator are shown as a series of dots. Under these circumstances, the operator is modulating the power take off speed.

When the circuit is in the power take off position with the operator able to fully modulate the main clutch 2 and the brakes as desired, the valve 158 disconnects the brake control pressure from valve 150 so that the main modulated clutch 2 can be engaged when the brakes are on. All other positions of the selector valve 42 causes brake pressure to disengage the main modulated clutch 2. The clutches 8 and 9 are in neutral by reason of pressure from check valve 160 acting on valves 53 and 54. Forward is engaged because the operator has selected forward, but had he selected backward, the reverse clutch 7 would have been engaged.

FIG. 10 shows the circuit at a low steady forward speed. High holding pressure is present in the solid heavy lines, operator controlled variable pressure is present in the lines consisting of a series of dots, and main apply pressure is shown in the heavy broken lines which pressure is present in the valves 51 and 53. Manual selector valve 42 is in the position for first gear which sends high holding pressure from line 26 to the circuits connected to line 162. Pressure in line 162 is passed by double check valve 163 and feeds the direction valves 35 and 36. Pressure from line 162 also causes valve 154 to allow supply of apply pressure to valve 53 causing clutch 8 to be engaged. The operator calling for forward motion depresses the valve 35 actuator spring so that operator controlled pressure is supplied to line 84 and applies the main clutch control line 27 via the inhibitor valve means 50, double check valve 164, and lubricating pressure valve 150.

FIG. 11 shows a low speed forward operation and when a call has been made by the operator for a reverse or backward motion. This diagram indicates the beginning of the cross over valving operation. Here again, as in the previously discussed views and others to follow, the high holding pressure is shown in the solid heavy lines, the operator controlled variable pressure is shown in a line consisting of a series of dots, and the main apply pressure is shown in the heavy broken lines. In addition in connection with FIG. 11, a rising pressure line is shown in the lines consisting of a series of small $x$'s. The machine is assumed to have been operating in the conditions shown in FIG. 10, namely low speed forward steady. The operator causes the conditions shown in FIG. 11 to be present by shifting his foot from the forward pedal 35 to the backward pedal 36. Release of pressure on the forward pedal removes main clutch control pressure and apply pressure to clutch 6. Application of forced pressure to the backward pedal 36 raises pressure in line 81 and causes pressure to move valve 83, allowing main apply pressure to flow to clutch 7 via valve 52. Increased force on the backward pedal 45 causes valve 36 to increase the pressure on line 81 which causes the main clutch control pressure to rise by flow through double check valve 164 and lubricating valve 150 and main clutch control valve 180. The vehicle is now going into the reverse direction, that is, clutch 7 is filling.

Figure 12:
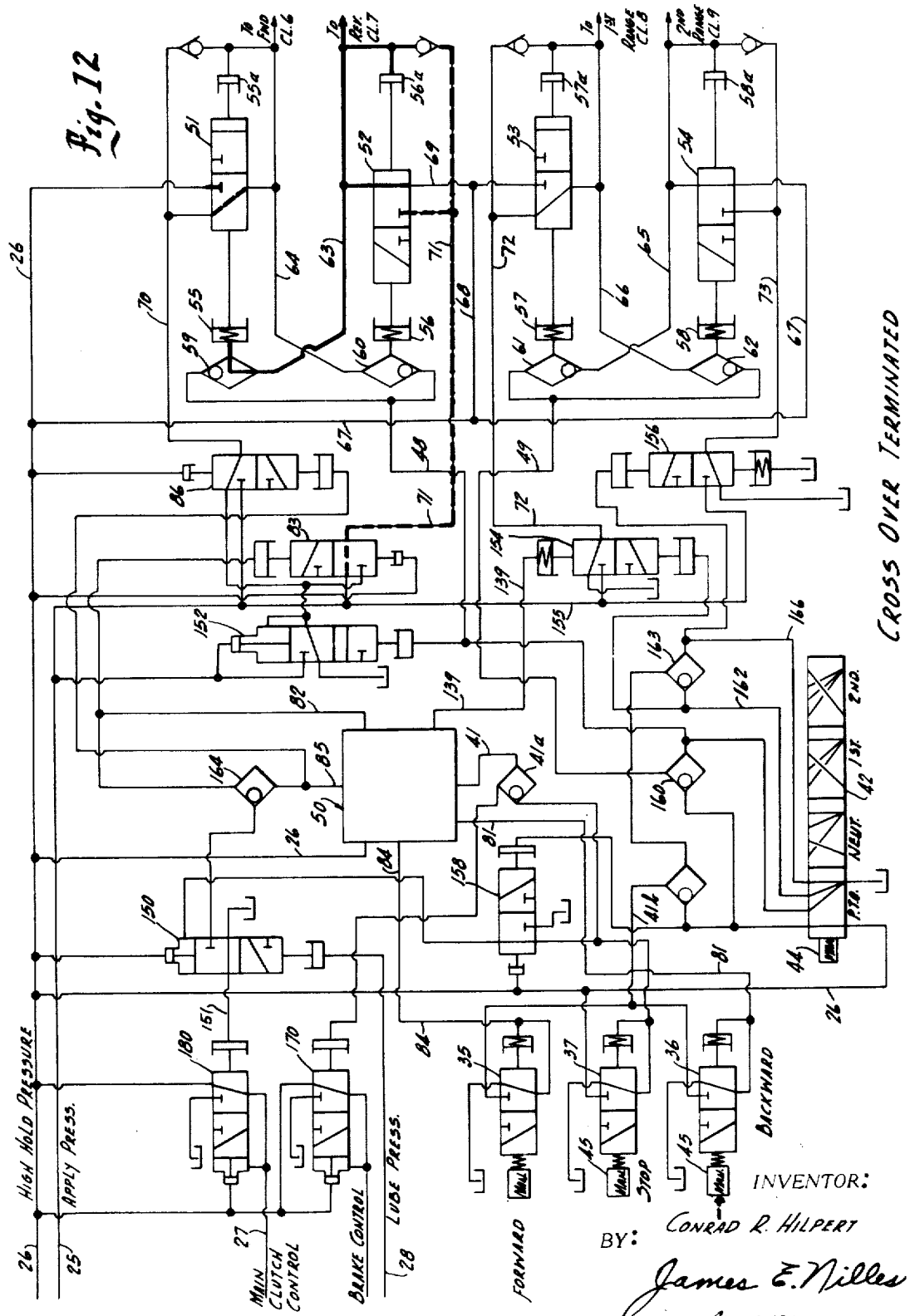

FIG. 12 shows the circuit under the conditions where the cross over taking place in FIG. 11 has now been terminated. High holding pressure is present in the heavy solid lines and more specifically at line 63 feeding clutch 7 high holding pressure. The cross over valve 52 has shifted so that high holding pressure is fed to the clutch and main apply pressure is removed. Also high holding pressure in line 63 has moved valve 51 to the position where it is ready for an application of main apply pressure from line 70 to the clutch 6 if desired. The machine is now in low speed backward steady drive.

Figure 13:
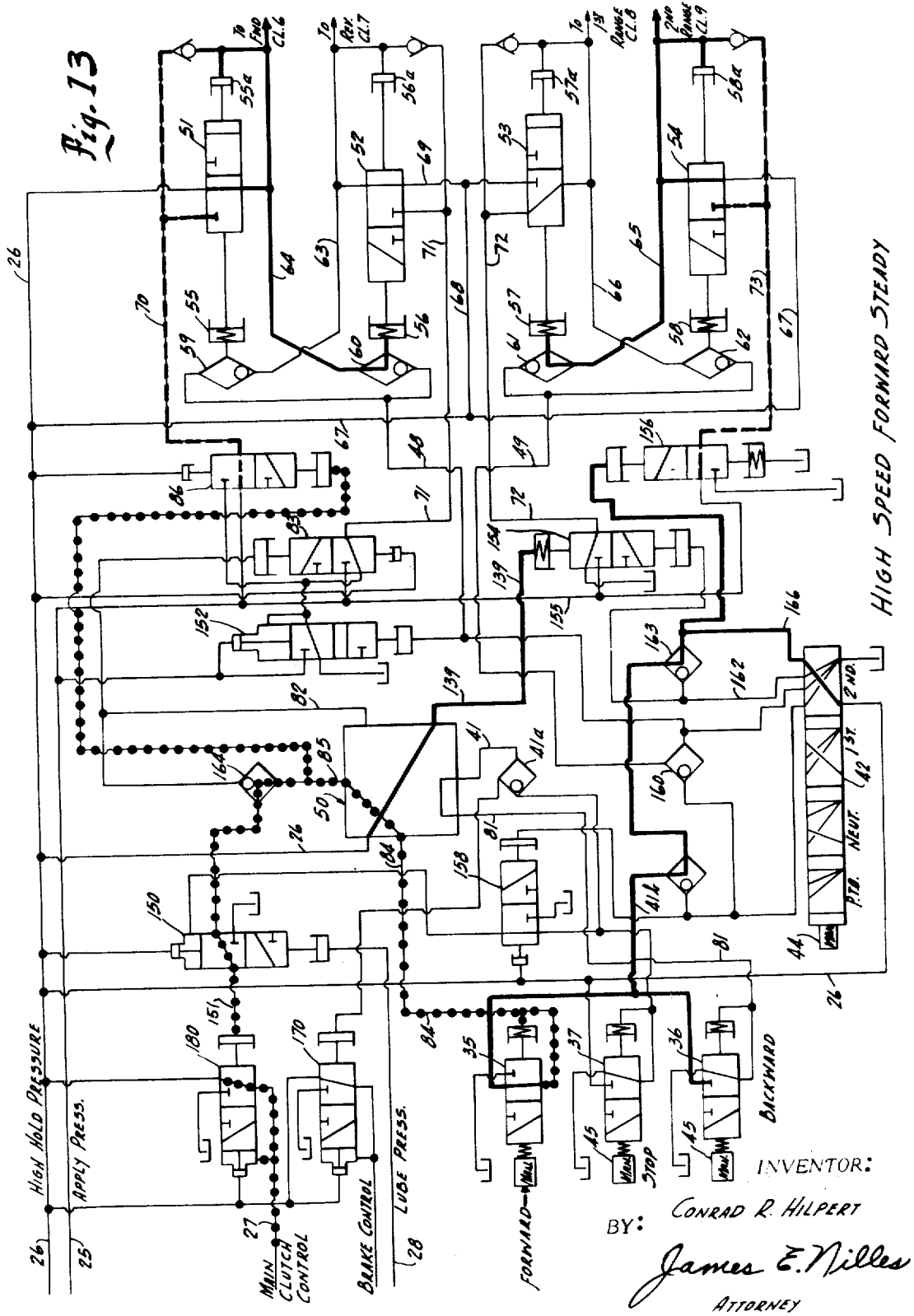

FIG. 13 shows the circuit at high speed forward position. In this position, the inhibit valve means 50 (FIG. 2) have routed high holding pressure to the top pilot of valve 154 where this pressure combined with the spring force will prevent pressure in the lower pilot moving valve 154, thus first range speed cannot be selected when this condition exists. Also, line 81 is connected to line 41 via the inhibitor valve means 50 thereby a call for backward movement will actually call for the brakes as long as this condition exists. The clutch 9 and clutch 6 are held by high holding pressure by the cross over valves 54 and 51. The vehicle is thus locked in second forward until operator control demands otherwise as allowed by the inhibitor system. The vehicle is in high speed forward steady because of the manual positioning of valve 42 connecting line 26 to line 166.

FIG. 14 shows the circuit when a high speed forward condition is present and then a call for downshift is prevented by valve 154 because it is held by the spring and pressure in its upper pilot. The vehicle is thereby held in second range speed by the valve 54. The operator has called for a downshift by positioning valve 42 in its first gear position connecting high holding pressure from line 26 to line 162. Pressure from line 162 is supplied to valve 154 to its lower pilot piston. Pressure in the lower pilot piston of valve 154 cannot move valve 154 because of the same pressure plus spring pressure in its upper spring pilot. The call for first range is thus prevented from taking effect until allowed by the inhibitor means 50.

FIG. 15 shows the operation when at high speed forward and then a call has been made for backward movement while at this high speed. The inhibit valve means connects line 81 to line 41 and produces operator controlled braking at speeds where the inhibit valves maintain the conduit 81 to conduit 41 connection. High speed backward and a call for forward would cause braking by an inhibit valve connection between conduit 84 and conduit 41. The machine having been in high speed forward operation is desired to be placed in high speed backward by the operator releasing force on forward valve 35 and applying force to the actuator of valve 36. Force applied to backward valve 36 causes pressure to rise in line 81. The inhibitor valve means 50 causes pressure in line 81 (dotted line) to be applied to brake valve 170 causing the call for backward by the operator to controllably apply the vehicle brakes. The vehicle is thus decelerated from high speed forward by operator controlled application of the brakes. Upon reaching an allowable low speed, the inhibitor valve means 50 will transfer operator controlled pressure in line 81 from the brake control to the main clutch control as in FIG. 13 and apply clutch 7 via the cross-over valve 52. The vehicle will now be accelerating under engine power controlled by the operator and main clutch.

FIG. 16 shows the brake circuit, in other words, when the vehicle is in operation, at a high speed and a demand is made for the brakes. It will be seen that the brake pressure routed to valve 150 makes it impossible to have the main modulated clutch 2 engaged when the stop pedal 40 is depressed. The call for brakes is made by the operator applying force to the stop valve 37. This valve applies operator controlled pressure directly to brake control valve 170 thus allowing operator to control the application of the vehicle brakes. As stated, pressure from valve 37 is routed to valve 150 and releases main clutch control pressure to sump, thus removing engine power from the transmission system regardless of intentional or inadvertent, simultaneous supply of forward or backward pressure from pedals 36 and 37. The vehicle remains in second forward, that is clutches 6 and 9 engaged, as it was previous to the operator calling for brakes.

FIG. 17 shows a medium forward operation during which a call is made for a downshift. In other words, it shows a downshift progressing at vehicle speeds which are such that the inhibit valve means 50 permits such downshifting. It will be noted that while the connection from line 26 to line 139 at the inhibit valve box 50 is removed at this speed, the conduit 81 is connected to conduit 41 in the inhibit valve means 50, thus a call for reverse will produce the braking effect, because the vehicle is operating at a speed in excess of that which the inhibitor would allow a reverse shift to take place. The inhibit valve means 50 is thus allowing a downshift, but preventing a reverse shift and upon call for a reverse shift would produce operator controlled braking as in FIG. 15. The operator has called for a downshift by repositioning manual valve 42 from its second range position to its first range position, thus causing the valve 150 to move allowing main apply pressure to flow to clutch 8 through valve 53 giving rising pressure in line 66.

Rising pressure in line 66 causes pressure in chamber 58 to increase. x'the pressure in chamber 58 creates force which exceeds the force in the piston chamber 58a at the opposite end of the valve, valve 54 moves. The movement of valve 54 removes high holding pressure from clutch 9 and connects clutch 9 to the sump via line 73 and valve 156. High holding pressure thus is removed from line 65 and is thus removed from chamber 57 of valve 53 allowing pressure building up in line 66 and acting on piston 57a to drive valve 53 to the position where high holding pressure is applied to clutch 8. The machine is now locked in low range. This completes the cross-over process. In this figure, increasing pressure is shown by the line indicated with a series of small x's.

FIG. 18 shows the circuit when the cross over in FIG. 17 has been terminated. It will be noticed that valve 53 is in position connecting high holding pressure to clutch 8 and valve 54 is in position connecting clutch 9 to the sump and is firmly held in this position by high holding pressure and the spring acting on spring pilot piston 58.

FIG. 19 shows a medium vehicle speed and then a call for a reverse movement and the inhibit valve action. Note the vehicle is still in gear and only the main modulated clutch 2 is released. The operator is unconsciously applying the brakes until the inhibit valves allow the shift. The call for reverse has been initiated by removal of an application of force on forward valve 35 to backward valve 36. The force on backward valve 36 allows a rising pressure in line 81 (line of dots), the inhibitor valve means 50 sensing a speed in excess of that allowable for a reverse causes the pressure in line 81 to give operator control of the brakes. Pressure in the main clutch control line was released when the operator removed force from the forward pedal to valve 35. Should the vehicle remain at this speed as in downhill operation the vehicle will be under control of the braking system as demanded by the operator until a speed is reached where the inhibitor will permit a reverse shift to take place. It will be noted that valves 51 and 53 maintain clutches 6 and 8 firmly engaged and the vehicle remains in its previous condition of first range forward. Thus, as mentioned, the operator unconsciously applies the brakes until the inhibitor valve means permits its backward shift.

FIG. 20 shows the circuit of neutral position, the reduced pressure line is shown by the lines composed of a series of small x's. The call for neutral is initiated by the operator positioning the valve 42 to its neutral position. High holding pressure is applied by double check valve 160, spring pilots 57 and 58 forcing valves 53 and 54 to release clutches 8 and 9. High holding pressure is also applied to spring pilots 55 and 56 placing clutches 6 and 7 in connection with lines 70 and 71. The high holding pressure is also applied to the lower pilot pistons of valve 152, which is a pressure reducing valve and applies a reduced pressure to valves 83 and 86 which allow this reduced pressure to flow through clutches 6 and 7 via lines 70 and 71. Note, both the forward and reverse clutches are applied at low pressure, the range clutches 8 and 9 are both released, and the vehicle is thereby free rolling and not creeping. In other words, there is no power connection between the transmission system and the wheels.

I claim:

1. In a vehicle having ground engaging means, a power transmission and brake, forward and reverse clutches of the hydraulically actuated type for driving said means in forward and reverse directions and for stopping said vehicle,
    a pressure fluid circuit including manually operated brake, forward and reverse fluid control valves for said brake, forward and reverse clutches, respectively, said circuit also including a brake control fluid line, manually operated direction controls connected to said forward and reverse clutches for operation thereof,
    inhibitor valve means including shiftable element means in fluid communication with and for controlling flow of pressure fluid from said fluid control valves, fluid lines from said inhibitor valves to said forward and reverse fluid control valves,
    a fluid pump driven in proportion to the vehicle ground speed and in fluid communication with said shiftable element means to cause shifting thereof,
    whereby when said vehicle is moving above a predetermined speed in one direction and said pump is correspondingly pumping pressure fluid to said inhibitor valve means, then when one of said direction control valves is actuated by the operator in calling for a reversal of vehicle direction, said inhibitor valve means being in fluid communication with said reverse clutch and said manually operated brake will cause manually controlled pressure fluid to actuate said manually operated brake and prevent a reverse shift until said vehicle speed slows down below said predetermined speed, and then said inhibitor valve means will permit said reversal of direction.

2. In a vehicle having ground engaging means, a power transmission and brake, forward and reverse clutches for driving said means in forward and reverse directions and for stopping said vehicle, and also having a first speed range clutch and a second speed range clutch for driving said vehicle at low and high speeds, said clutches being of the hydraulically actuated type, a pressure fluid circuit including manually operated brake, forward and reverse fluid control valves for said brake, forward and reverse clutches, respectively, a reverse inhibitor valve including a shiftable element in fluid communication with and for controlling flow of pressure fluid from said fluid control valves, a fluid pump driven in proportion to the vehicle ground speed and in fluid communication with said reverse inhibitor valve shiftable element to cause shifting thereof, a downshift inhibitor valve including a shiftable element in fluid communication with and for controlling flow to said speed range clutches, said downshift inhibitor valve element also being in fluid communication with valve shiftable element and with said reverse inhibitor valve, whereby when said vehicle is moving above a predetermined speed in one direction and said pump is correspondingly pumping pressure fluid to said inhibitor valves, then (1) when one of said direction control valves is actuated by the operator in calling for a reversal of vehicle direction, said inhibitor valves will cause pressure fluid to actuate said brake clutch until said vehicle speed slows down below said predetermined speed, and then said inhibitor valves will permit said reversal of direction, and (2) when a downshift from said second speed range clutch to said first speed range clutch is called for by said operator, said inhibitor valves will cause pressure fluid to hold vehicle in its former gear until said vehicle slows down below a predetermined speed.

3. In a vehicle having ground engaging means, a power transmission and brake, forward and reverse clutches of the hydraulically actuated type for driving said means in forward and reverse directions and for stopping said vehicle, a pressure fluid circuit including manually operated brake, forward and reverse fluid control valves for said brake, forward and reverse clutches, respectively, inhibitor valve means including a shiftable element means in fluid communication with and for controlling flow of pressure fluid from said fluid control valves, a fluid pump driven in proportion to the vehicle ground speed and in fluid communication with said shiftable element means to cause shifting thereof, whereby when said vehicle is moving above a predetermined speed in one direction and said pump is correspondingly pumping pressure fluid to said inhibitor valve means, then when one of said direction control valves is actuated by the operator in calling for a reversal of vehicle direction, said inhibitor valve means will cause pressure fluid to actuate said brake clutch until said vehicle speed slows down below said predetermined speed, and then said inhibitor valve means will permit said reversal of direction;

said vehicle also having a pair of fluid actuated gear shift clutches, a fluid pressure operated shiftable control valve including a shiftable portion for each of said gear shift clutches, said shiftable control valves having an operatoring pilot at each end for shifting said portion, a high hold pressure line connected to each of said shiftable control valves and communicable with said portion, an apply pressure line connected to each shiftable control valve and communicable with said portion, a cross-over fluid circuit including a double check valve between the operating pilot of one of said shiftable control valves and an operator pilot of the other control valve, said cross-over fluid circuit also communicable with said shiftable portion, control means for applying fluid pressure from said apply pressure line to the pilot of one of said shiftable control valves via said cross-over fluid circuit while at the same time high hold pressure is applied to the other shiftable control valve to hold the latter and its associated clutch until the clutch of said one shiftable control valve commences to be engaged, and then the clutch of said other shiftable control valve is released.

4. In a vehicle having ground engaging means, a power transmission and brake, forward and reverse clutches for driving said means in forward and reverse directions and for stopping said vehicle, and also having a first speed range clutch and a second speed range clutch for driving said vehicle at low and high speeds, said clutches being of hydraulically actuated type, a pressure fluid circuit including manually operated brake, forward and reverse fluid control valves for said brake, forward and reverse clutches respectively, a reverse inhibitor valve including a shiftable element in fluid communication with and for controlling flow of pressure fluid from said fluid control valves, a fluid pump driven in proportion to the vehicle ground speed and in fluid communication with said reverse inhibitor valve shiftable element to cause shifting thereof, a downshift inhibitor valve including a shiftable element in fluid communication with and for controlling flow to said speed range clutches, said downshift inhibitor valve element also being in fluid communication with said pump and with said reverse inhibitor valve, whereby when said vehicle is moving above a predetermined speed in one direction and said pump is correspondingly pumping pressure fluid to said inhibitor valves, then (1) when one of said direction control valves is actuated by the operator in calling for a reversal of vehicle direction, said inhibitor valves will cause pressure fluid to actuate said brake clutch until said vehicle speed slows down below said predetermined speed, and then said inhibitor valves will permit said reversal of direction, and (2) when a downshift from said second speed range clutch to said first speed range clutch is called for by said operator, said inhibitor valves will cause pressure fluid to hold vehicle in its original gear until said vehicle speed slows down below a predetermined speed;

said vehicle also having a pair of fluid actuated gear shift clutches, a fluid pressure operated shiftable control valve including a shiftable portion for each of said gear shift clutches, said shiftable control valves having an operator pilot at each end for shifting said portion, a high hold pressure line connected to each of said shiftable control valves and communicable with said portion, an apply pressure line connected to each shiftable control valve and communicable with said portion, a cross-over fluid circuit including a double check valve between the operating pilot of one of said shiftable control valves and an operating pilot of the other control valve, said cross-over fluid circuit also communicable with said shiftable portion, control means for applying fluid pressure from said apply pressure line to the pilot of one of said shiftable control valves via said cross-over fluid circuit while at the same time high hold pressure is applied to the other shiftable control valve to hold the latter and its associated clutch until the clutch of said one shiftable control valve commences to be engaged, and then the clutch of said other shiftable control valve is released.

* * * * *